US005130662A

United States Patent [19]

Jorgensen et al.

[11] Patent Number: 5,130,662

[45] Date of Patent: Jul. 14, 1992

[54] AUDIO SIGNAL SWITCHING SYSTEM

[75] Inventors: Bent Jørgfensen, Albertslund; Harald Toft, Copenhagen, both of Denmark

[73] Assignee: NTP Elektronik A/S, Herlev, Denmark

[21] Appl. No.: 667,871

[22] Filed: Mar. 12, 1991

[30] Foreign Application Priority Data

Mar. 12, 1990 [DK] Denmark .............................. 646/90

[51] Int. Cl.5 .............................................. H04B 3/00

[52] U.S. Cl. .......................................... 330/51; 381/81

[58] Field of Search ...................... 330/51, 124 R, 127, 330/165, 170, 295, 297, 66; 381/80, 81

[56] References Cited

U.S. PATENT DOCUMENTS

| | | | |
|---|---|---|---|
| 2,911,605 | 11/1989 | Wales | 336/200 |
| 3,002,260 | 10/1961 | Shortt et al. | 29/155.5 |
| 3,089,106 | 5/1963 | Saaty | 336/200 |
| 3,483,499 | 12/1969 | Lugten | 336/180 |
| 3,541,260 | 11/1970 | Jarvis | 381/119 X |
| 3,626,097 | 12/1971 | Bloom | 381/80 |
| 3,848,210 | 11/1974 | Felkner | 336/200 |
| 4,635,288 | 1/1987 | Stadius | 381/119 |
| 4,879,751 | 11/1989 | Franks et al. | 381/119 |
| 4,885,792 | 12/1989 | Christensen et al. | 381/119 |

FOREIGN PATENT DOCUMENTS

| | | |
|---|---|---|
| 0035694 | 9/1981 | European Pat. Off. . |
| 0033441 | 9/1984 | European Pat. Off. . |
| 0170170 | 4/1987 | European Pat. Off. . |
| 906831 | 3/1954 | Fed. Rep. of Germany . |
| 1217465 | 5/1966 | Fed. Rep. of Germany . |
| 1764658 | 4/1971 | Fed. Rep. of Germany . |
| 2361270 | 12/1973 | Fed. Rep. of Germany . |
| 2710291 | 9/1977 | Fed. Rep. of Germany . |
| 3148192 | 6/1983 | Fed. Rep. of Germany . |
| 3524692 | 6/1986 | Fed. Rep. of Germany . |
| 3722124 | 2/1988 | Fed. Rep. of Germany . |
| 1397977 | 5/1988 | U.S.S.R. . |
| 1180923 | 2/1970 | United Kingdom . |

OTHER PUBLICATIONS

Jones, W. H., "The Pye TVT Approach to Audio Control Systems", Int'l Broadcast Eng. v. 6, n. 122 pp. 4-6, 8-11, Mar. 1975.

van der Linde, *Design of a high-frequency planar power transformer in multilayer technology* EPE Aachen 1989 pp. 1501-1506.

*Primary Examiner*—Steven Mottola

*Attorney, Agent, or Firm*—Merchant, Gould, Smith, Edell, Welter & Schmidt

[57] ABSTRACT

The present invention relates to the technical field of audio engineering, more specifically audio recording studio technique, radio and television broadcasting technique, the present invention comprising: a first plurality of input amplifier means, each of said input amplifier means having a first transformer means and a first buffer amplifier means, a second plurality of output amplifier means, each of said output amplifier means having a second transformer means and a second buffer amplifier means, switching means for interconnecting at least a single output of a specific input amplifier means and at least a single input of a specific output amplifier means for inputting said amplified and unbalanced signal from said specific input amplifier means to said specific output amplifier means.

11 Claims, 17 Drawing Sheets

AUDIO SIGNAL SWITCHING SYSTEM

Figure 1:
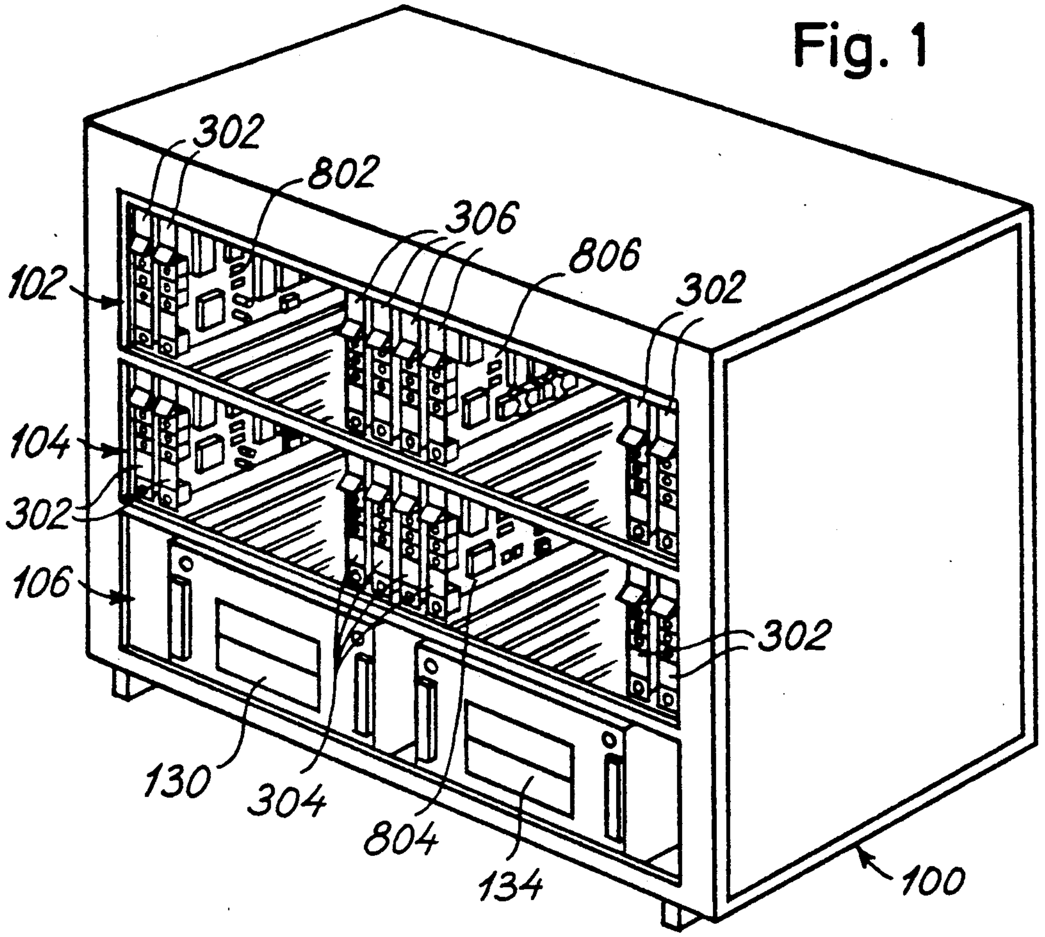

The present invention relates to the technical field of audio engineering, more specifically audio recording studio technique, radio and television broadcasting technique, etc. Within this technical field, a specific line output, normally a balanced ungrounded output of a nominal line level of e.g. +4 dBm or +6 dBm (0 dBm=0.775 V, 1 mW 600 Ω), is to be switched to a line input which constitutes a balanced, ungrounded input of a remotely located facility at a certain time, at which time a different output from a different apparatus or different equipment is to be input to an input of another apparatus.

After a specific set-up has been used, the inputs and the outputs are to be connected to different outputs and inputs, respectively. In order to interface a large number of line outputs to a large number of inputs and render it possible to switch from a specific connection between a specific input and a specific output at any time without having to shift a great number of cables and plugs, etc., switching systems, often referred to as routing switcher systems, have been developed.

In a conventional crossfield or switching system, a plurality of input amplifiers, e.g. 16, 24, 32, etc. are provided each having an input transformer for receiving a balanced line input. The input transformer constitutes a debalancing transformer, which is connected to an input of a buffer amplifier of the input amplifier in question. The outputs of the buffer amplifiers are connected to respective inputs of a switch array of a matrix configuration, which is further connected to unbalanced inputs of respective buffer amplifiers constituting components of output amplifiers, which buffer amplifiers have their outputs connected to large, high-power balancing output transformers, the balanced output sides of which constitute balanced outputs of the switching or routing switcher system.

As the output amplifiers and especially the balancing output transformers of the output amplifiers have to be sable to provide sufficient electrical power for driving a long balanced line of a nominal level of e.g. +6 dBm and of a headroom of e.g. 20 dB into a 600 Ω line input, the output transformers have to be of fairly large dimensions, which results in that the known routing switcher systems are extremely bulky. The output transformers of the output amplifiers further require a certain spacing to an adjacent output transformer in order to eliminate crosstalk between any two adjacent output transformers.

An object of the present invention is to provide an audio signal switching system, in particular an audio signal routing switcher system of a concept which allows a large number of balanced and/or ungrounded inputs to be switched to an extremely large number of balanced and/or ungrounded outputs in an extremely compact system.

A particular feature of the audio signal switching system according to the present invention is that an audio signal switching system comprising up to 96 input channels and up to 192 output channels may be housed within a single 6-unit 19" housing, i.e. a housing of a width of 19" and of a height of 6×1¾". The audio signal switching system according to the present invention requires approximately ¼ of the space required by a conventional audio signal switching system of identical input/output capability.

A further object of the present invention is to provide an audio signal switching system of extremely compact structure, yet providing galvanic separation between the inputs of the system and the system itself and further between the outputs of the system and the system itself, still fulfilling the basic requirements of professional audio equipment and having technical specifications which are by no means inferior to those of conventional, bulky audio switching systems.

The above objects, features and numerous other objects and features and further a great number of advantages, which will be evident from the below detailed description of a preferred embodiment of an audio signal switching system according to the present invention are obtained by an audio signal switching system according to the present invention comprising:

a first plurality of input amplifier means, each of said input amplifier means having a first transformer means and a first buffer amplifier means, said first transformer means having a transformer input and a transformer output constituting a balanced input and an unbalanced output, respectively, said first transformer means receiving a balanced input signal at its transformer input, converting said balanced input signal into an unbalanced input signal and outputting said unbalanced input signal from its transformer output, said first buffer amplifier means having an amplifier input and an amplifier output, said amplifier output of said first buffer amplifier means constituting an output of said input amplifier means, said amplifier input of said first buffer amplifier means being connected to said transformer output of said first transformer means, and said first buffer amplifier means receiving said unbalanced input signal from said transformer output of said first transformer means at its amplifier input, amplifying said unbalanced input signal and outputting an amplified and unbalanced signal from its amplifier output, a second plurality of output amplifier means, each of said output amplifier means having a second transformer means and a second buffer amplifier means, said second transformer means having a transformer input and a transformer output constituting a grounded input and an ungrounded output, respectively, said transformer input of said second transformer means constituting an input of said output amplifier means, said second transformer means receiving an output signal at its transformer input, converting said output signal into an ungrounded output signal and outputting said ungrounded output signal from its transformer output, said second buffer amplifier means having an amplifier input and a pair of symmetrical amplifier outputs, said second buffer amplifier means receiving said ungrounded output signal from said transformer output of said second transformer means at its amplifier input, amplifying said ungrounded signal and outputting an amplified ungrounded and symmetrical output signal from its pair of symmetrical amplifier outputs, switching means for interconnecting at least a single output of a specific input amplifier means and at least a single input of a specific output amplifier means for inputting said amplified and unbalanced signal from said specific input amplifier means to said specific output amplifier means, and a switch mode power supply means comprising an oscillator means generating an oscillator signal, and an output power means receiving said oscillator signal from said oscillator means and outputting a power oscillator signal, each of said output amplifier means comprising a separate switch mode power supply means receiving said power oscillator signal from said output power means of said switch mode power supply and including a separate switch mode power supply transformer means, said second transformer means and said switch mode power supply transformer means of each of said output amplifier means galvanically separating said pair of symmetrical outputs of said second buffer amplifier means of each of said output amplifier means from each other and from said outputs of said input amplifier means, respectively.

The basic realization, which renders it possible to provide an extremely compact audio signal switching system in accordance with the teachings of the present invention, is that a galvanic separation of an audio output buffer may be established in a way highly different from the conventional way of providing a large, bulky high-power audio output transformer, viz. by providing an input transformer at the input of the buffer amplifier and further by galvanically separating the buffer amplifier through a switch-mode power supply transformer, which in spite of its requirement as to power transmission may be extremely compact, as the coupling at the oscillator frequency of the switch mode supply is extremely efficient.

This realization renders it possible to provide an extremely compact audio signal switching system, which as compared to a conventional audio switching system requires far less space, such as approximately ¼ of that required by a conventional, bulky audio signal switching system.

The switching means for interconnecting a specific output of a specific input amplifier means and a specific input of a specific output amplifier means may be established in numerous ways, e.g. through jack fields, manual switches, hard wire connections, etc. The switching means may further in accordance with the present invention comprise any number of inputs and outputs less than or larger than the number of outputs of the input amplifier means and the number of inputs of the output amplifier means, respectively.

In the presently preferred embodiment of the audio signal switching system according to the present invention, the switching means preferably comprises a switch array means of a matrix configuration comprising a number of inputs identical to the first plurality of input amplifier means and a number of outputs identical to the second plurality of output amplifier means so that the switch array means is readily connectable to any output of the input amplifier means and any input of the output amplifier means, as the inputs of the switching array means are connected to respective outputs of the first plurality of input amplifier means, and as the outputs of the switching array means are connected to respective inputs of the second plurality of output amplifier means. Still further, the switching array means is preferably constituted by an electronically addressable switching array means, such as a relay bank, an analog switch array or the like.

As discussed above, the provision of a separate switch mode power supply transformer means of each output amplifier means provides a galvanic separation between a specific output amplifier means and the remaining part of the audio signal switching system. Although the transformer of the separate switch mode power supply transformer means of each output amplifier means may be constituted by a conventional transformer, such as a toroid transformer, a transformer comprising a core and separate primary and secondary windings provided by winding an electrical wire around the core of the transformer, an extremely compact structure of a surprisingly high quality is provided in an embodiment of the audio signal switching system according to the present invention, in which embodiment each of the switch mode power supply transformer means is constituted by a primary section and one or more secondary sections being implemented in multilayer technique and comprising at least one layer including one or more primary windings, and one or more layers including one or more screens for screening the primary windings relative to the environment so as to eliminate noise generated by capacitive coupling, and each of the second sections being implemented in multilayer technique and comprising at least one layer including one or more secondary windings and one or more layers including one or more screens for screening the secondary windings relative to one another and relative to the environment so as to eliminate noise generated by capacitive coupling to the secondary winding.

Apart from providing a structure of extremely high compactness, the provision of a separate switch mode power supply transformer in multilayer technique reduces the difference between any two switch mode power supply transformers, which in accordance with the multilayer technique may be manufactured at extremely small tolerances and at extremely high reproducibility.

Further advantages obtained by employing transformer implemented in multilayer technique are those inherently connected to the multilayer technique involved, i.e. advantages originating from the automatized production processes of printed circuit board and multilayer technique, a solid structure provided by the supporting substrate or substrates, an extremely compact structure and a fairly low price per component at a fairly high production volume as compared to a conventional transformer structure, which involves a low initial cost and a high production cost per unit.

A still further advantage obtainable by providing a separate multilayer transformer constituting a galvanic separating component of the output amplifier means of the audio signal switching system according to the present invention is the possibility of providing a separate layer including a first set of terminals for establishing electrically conductive contact to the primary windings and providing a separate layer including a set of terminals for establishing electrically conductive contact to the secondary windings.

Furthermore, the separate layers may be provided with terminals for establishing electrically conductive contact to the one or more screens of the multilayer transformer and further the separate layer at secondary sections have provisions for mounting a rectifier means, i.e. providing a transformer structure, in which the switch mode power supply transformer means includes its inherent rectifier and provides a positive and a negative supply voltage from its output terminals, and for provisions for mounting capacitors.

The elimination of noise injected through capacitive coupling to the secondary winding of the multilayer transformer constituting a galvanic separating component of the output amplifier means of the audio signal switching system according to the present invention may be further refined by providing one or more screens comprising secondary windings screen and a separate layer with provisions for mounting a potentiometer and with terminals for establishing electrically conductive contact between the potentiometer and secondary winding screens for balancing the secondary winding screens relative to one another.

The audio signal switching system according to the present invention may be implemented in numerous ways involving printed circuit board technique, thick-film technique, thin-film technique, multilayer technique, hybrid technique comprising a combination of the above techniques and further large-scale integrated circuitry technique, custom designed circuit technology, etc. Preferably, the audio signal switching system according to the present invention is of a modular structure, in which three main components, viz. an input section, an output section and an interfacing or switching section, are provided comprising the input amplifier means, the output amplifier means including the switch mode power supply, and the switching means, respectively. By providing a modular structure, an audio signal switching system may be manufactured in any configuration comprising any arbitrary number of inputs and any arbitrary number of outputs still of an extremely compact structure.

The applicant company has for several years in its range of broadcasting and studio equipment employed a zerofield transformer coupling technique, which is further disclosed and described in published German patent application No. 27 10 291 in accordance with which zerofield technique, an increased band width of a transformer coupling is obtained at extremely small geometrical dimensions of the input transformer by short-circuiting the secondary winding of the input transformer through a virtual short-circulating connection established by an inverting amplifier. In the presently preferred embodiment of the audio signal switching system according to the present invention, this transformer coupling technique is preferably employed for providing extremely compact input amplifier means and/or output amplifier means, consequently, each of said input amplifier means and/or each of said output amplifier means preferably constitutes a transformer coupled zerofield amplifier means, in which the transformer is short-circuited through a virtual short-circuiting connection across its secondary winding.

Figure 2:
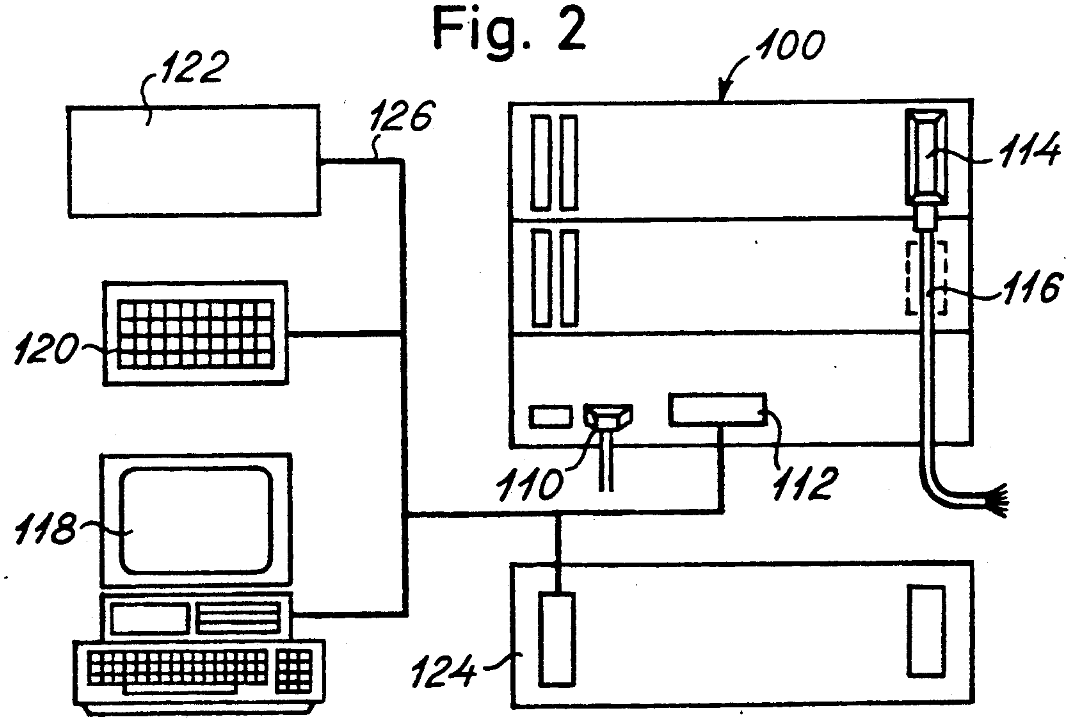
Figure 3:
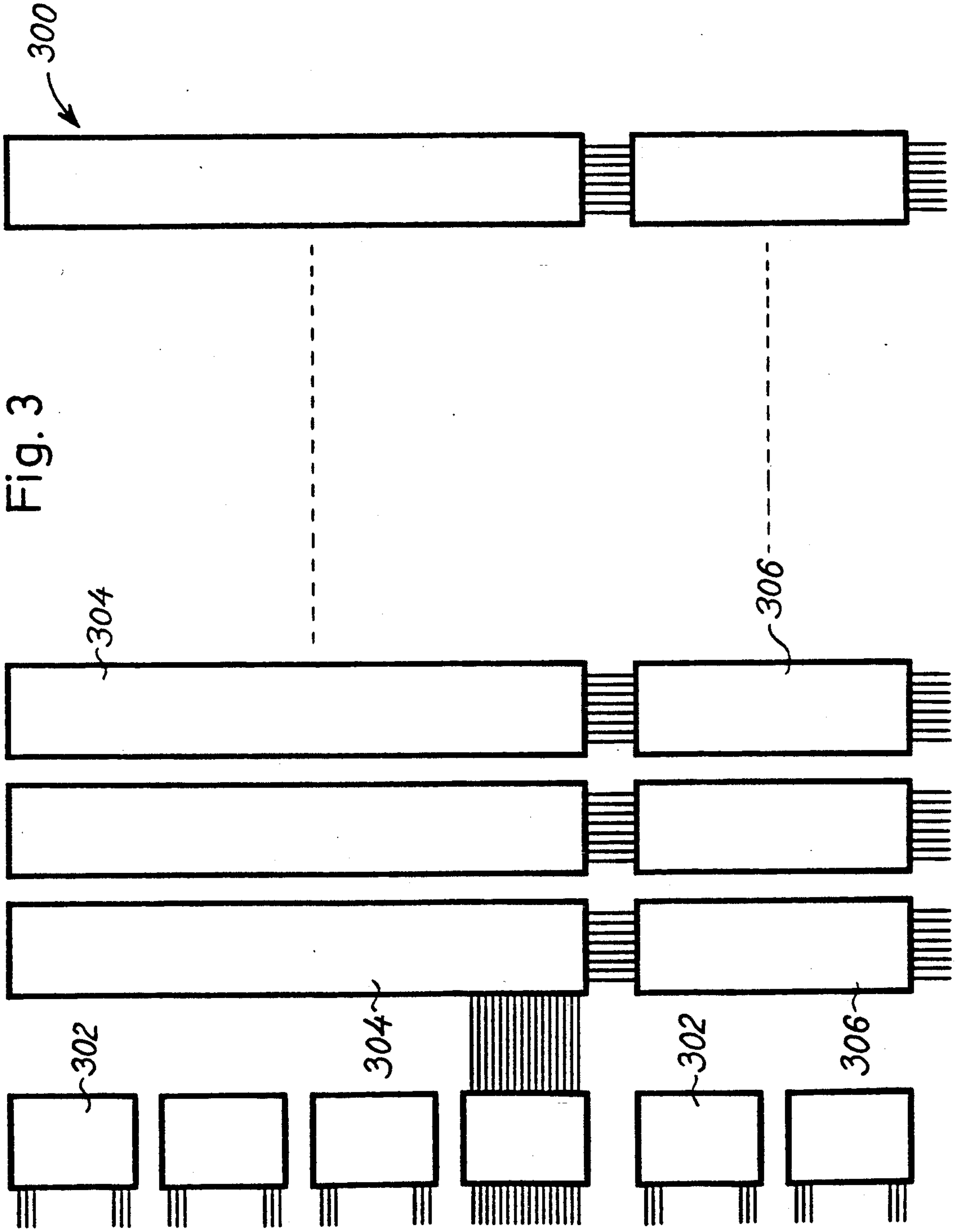
Figure 4:
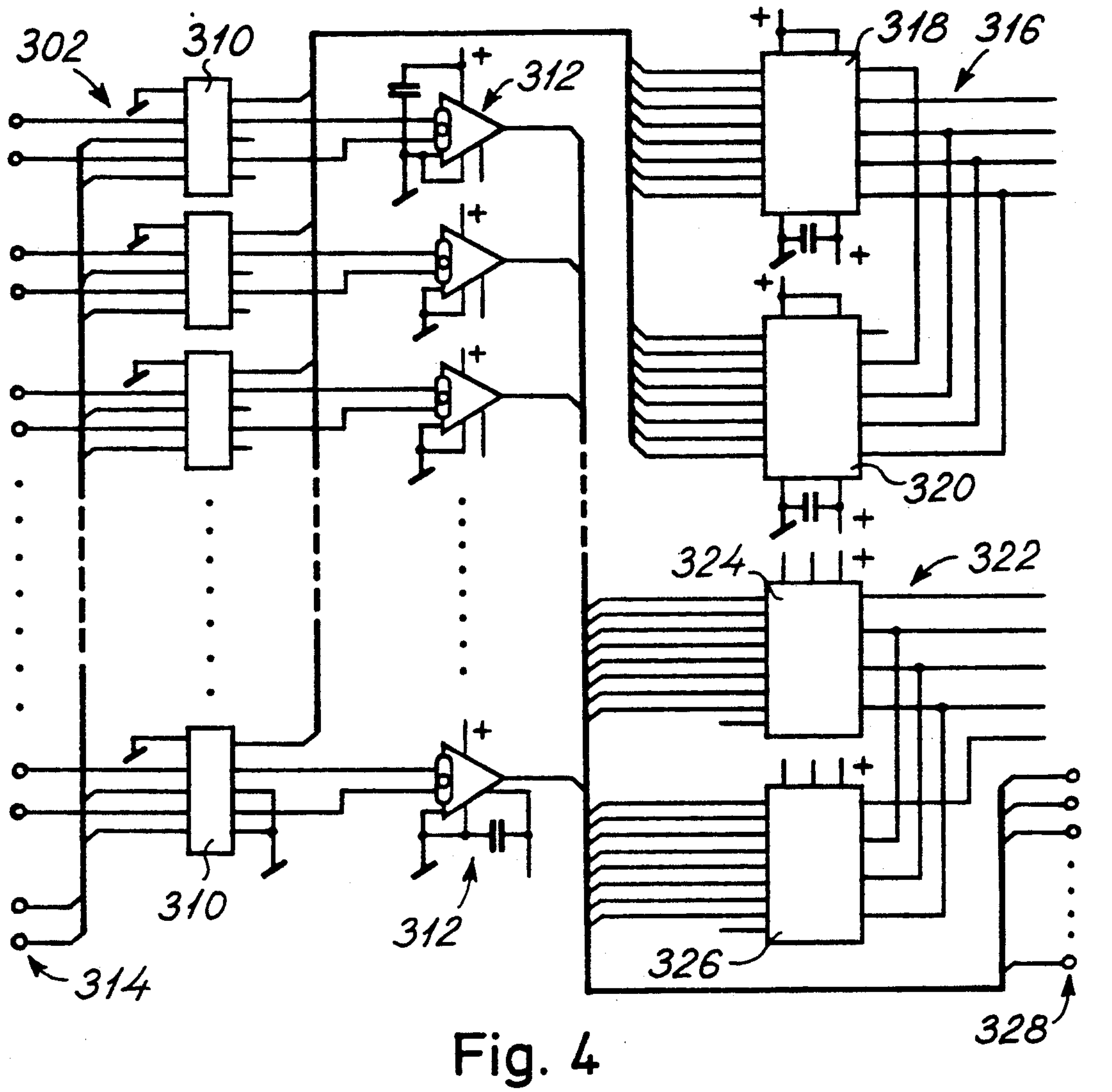
Figure 5:
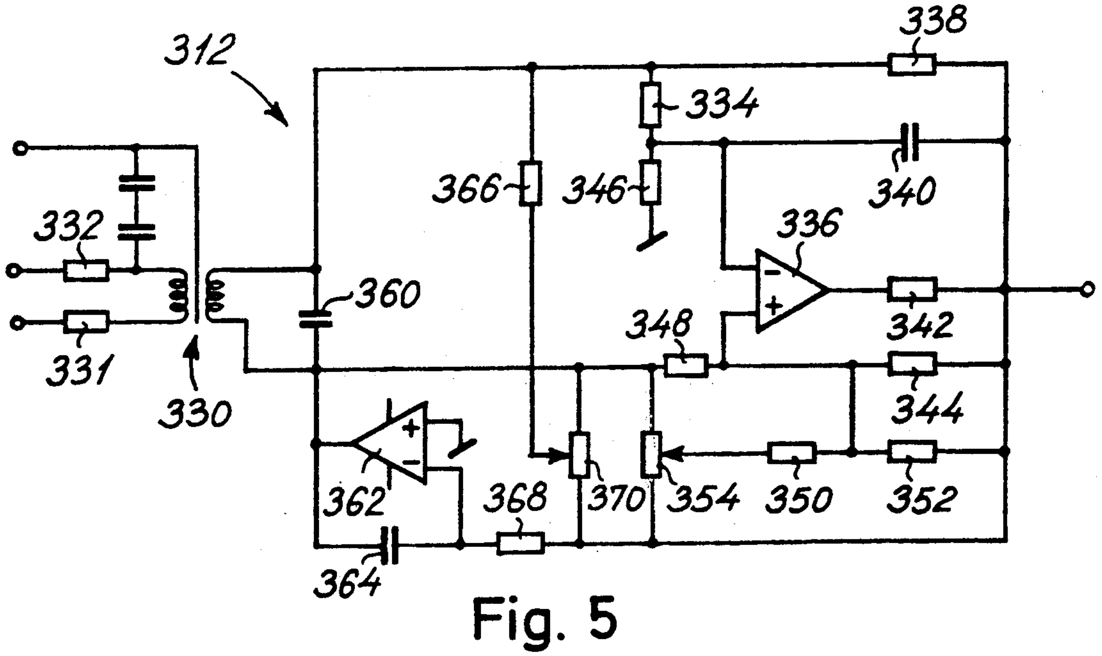
Figure 6:
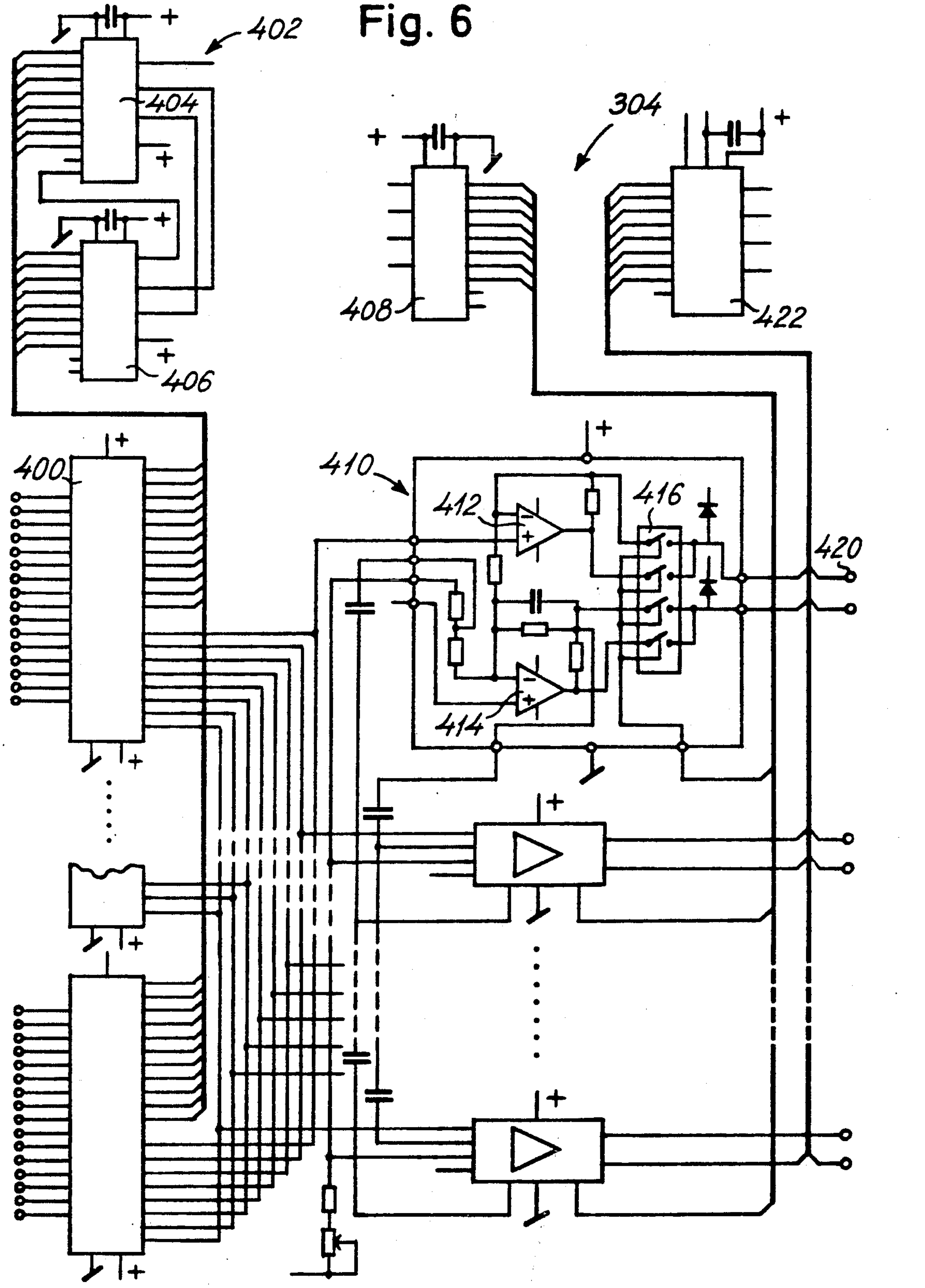
Figure 7:
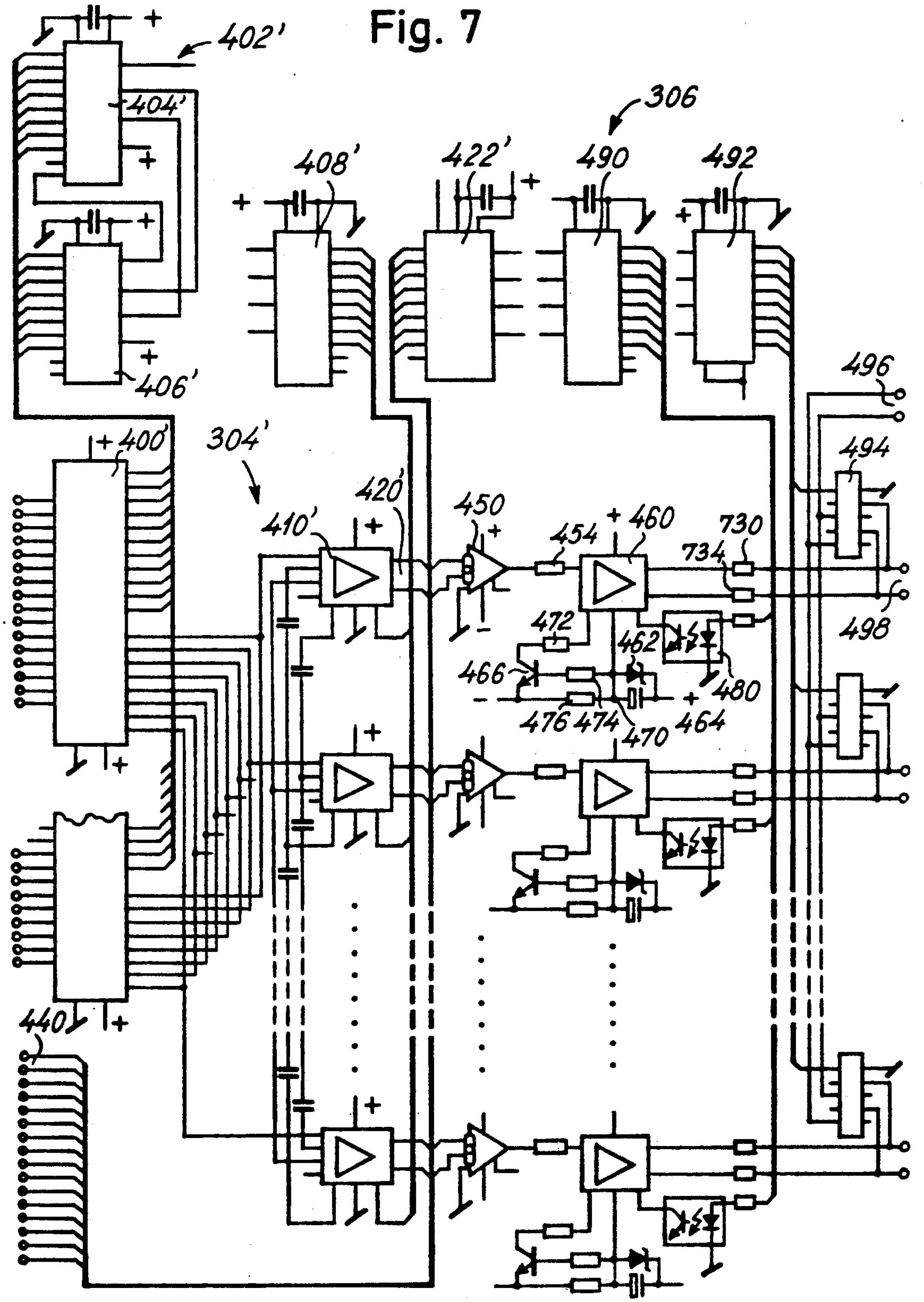
Figure 8:
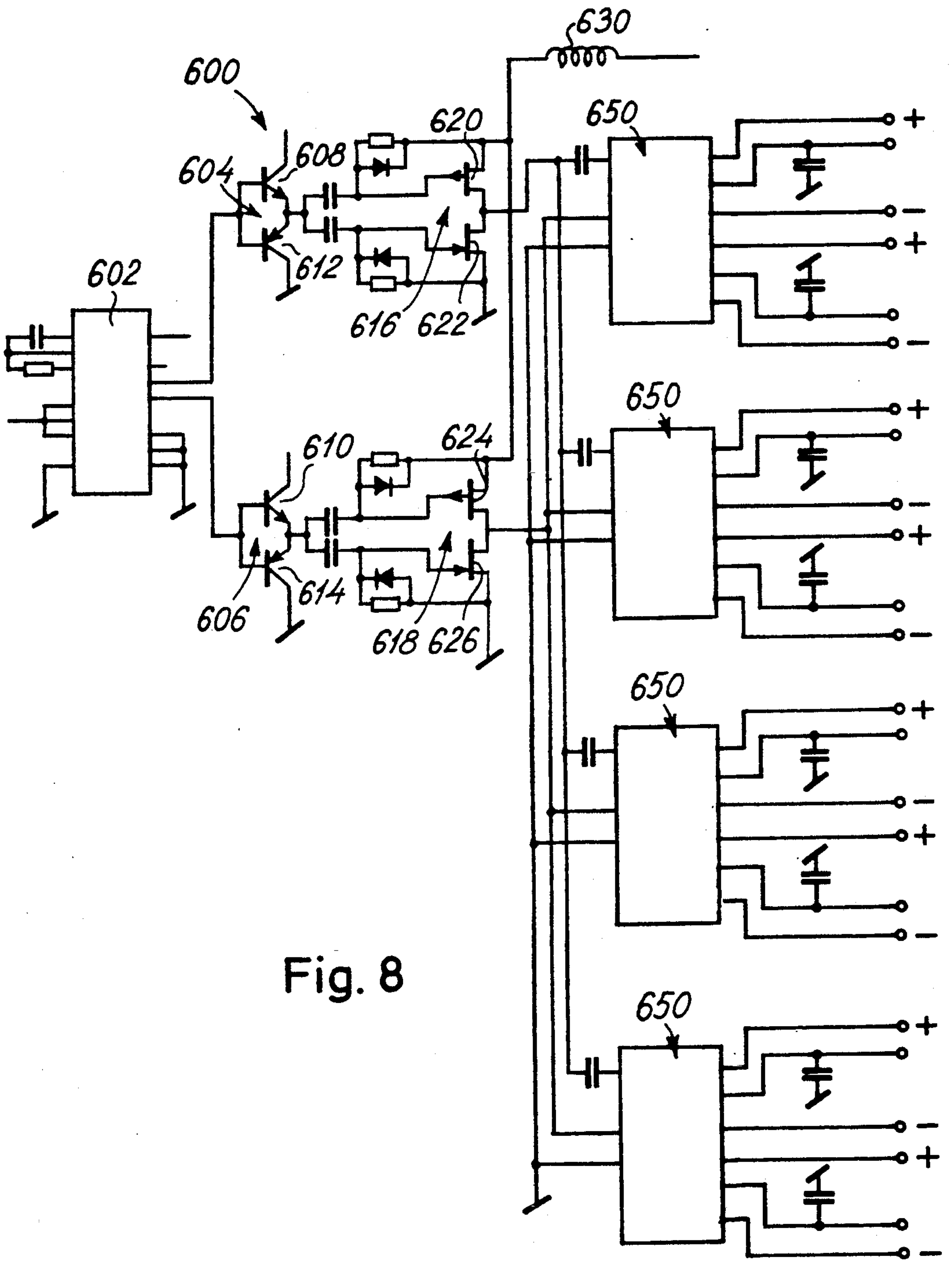
Figure 9:
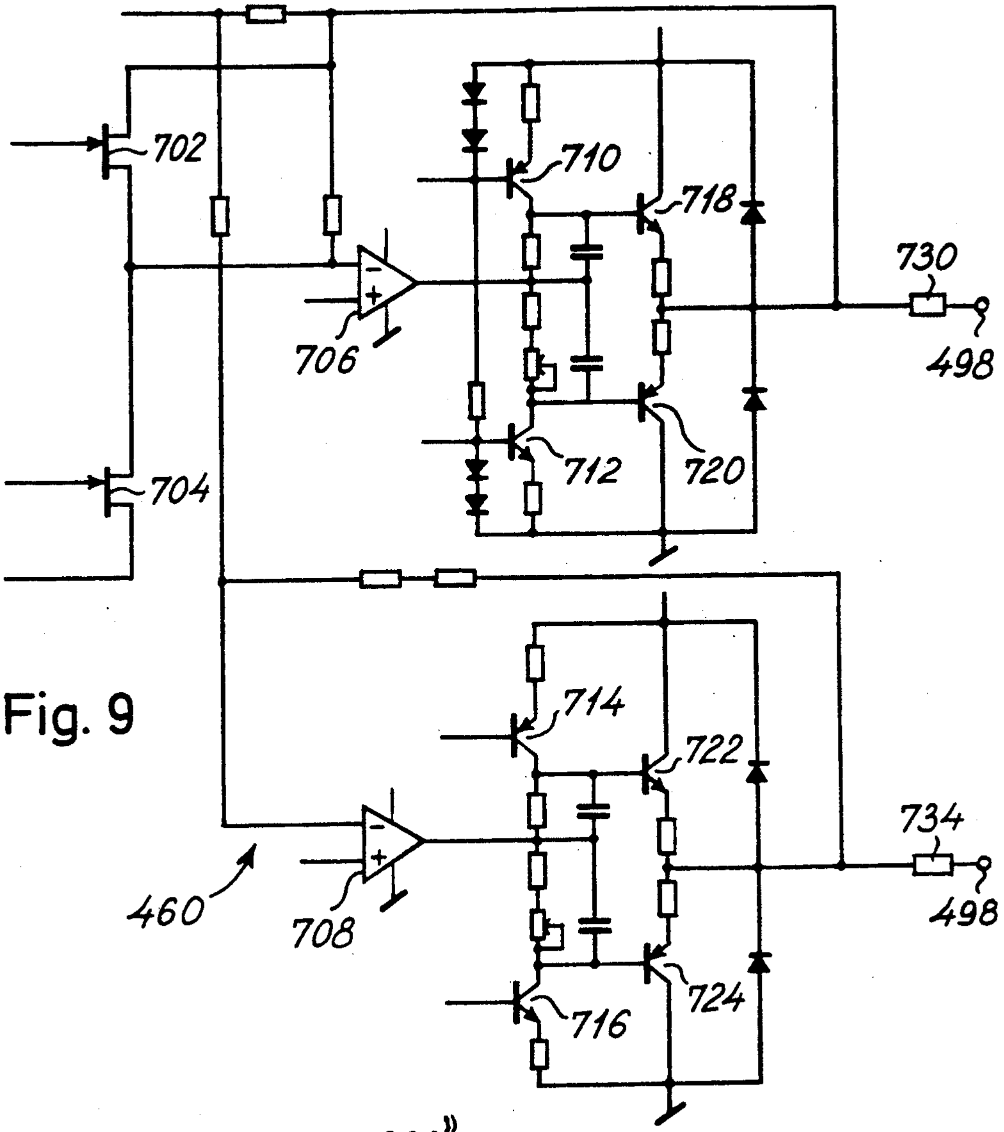
Figure 18:
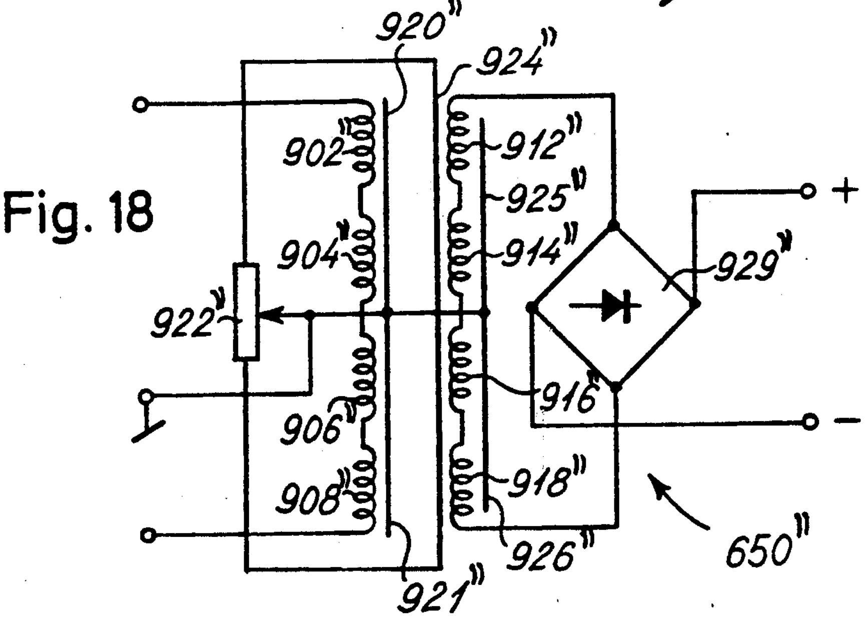
Figure 13:
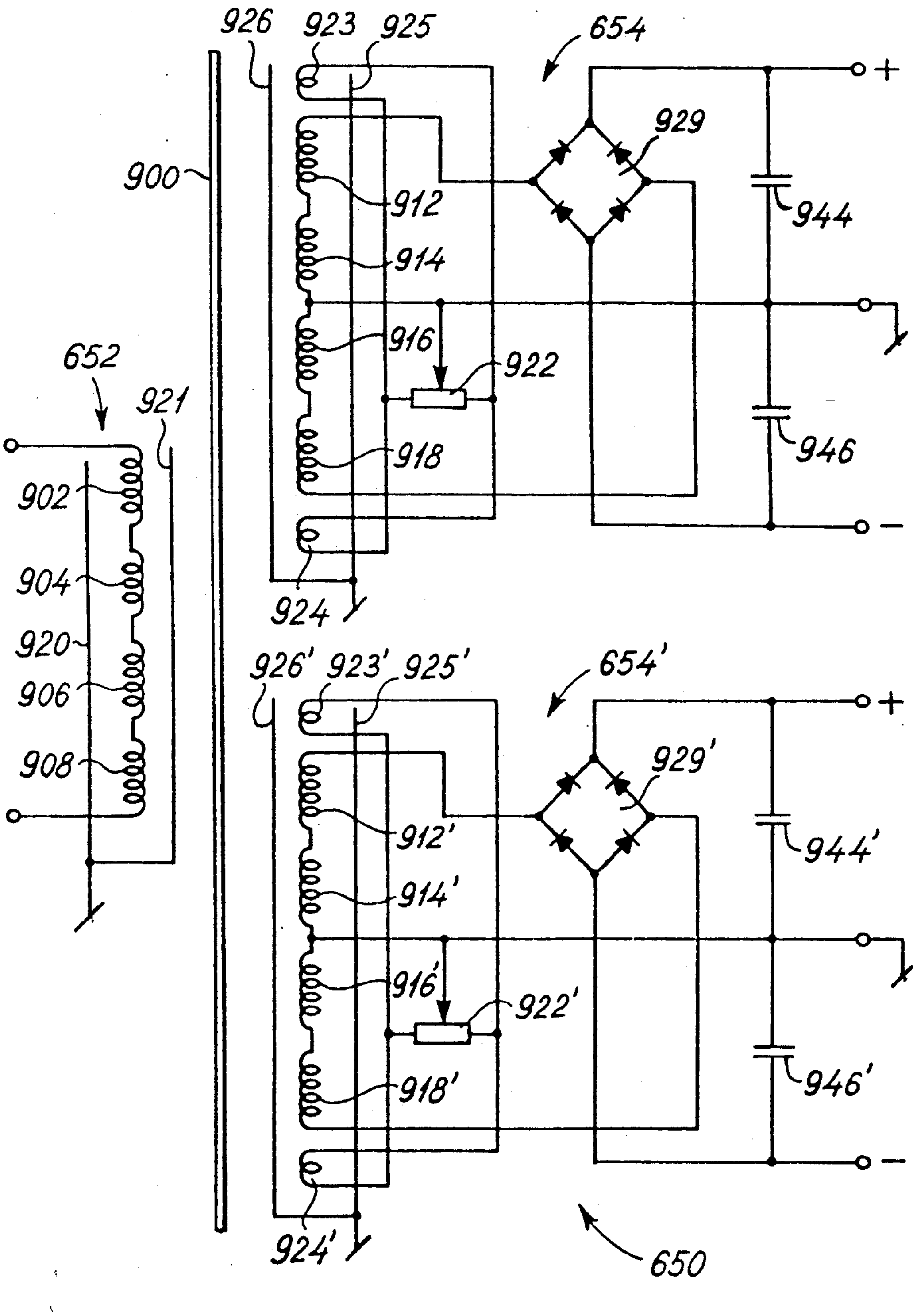
Figure 14:
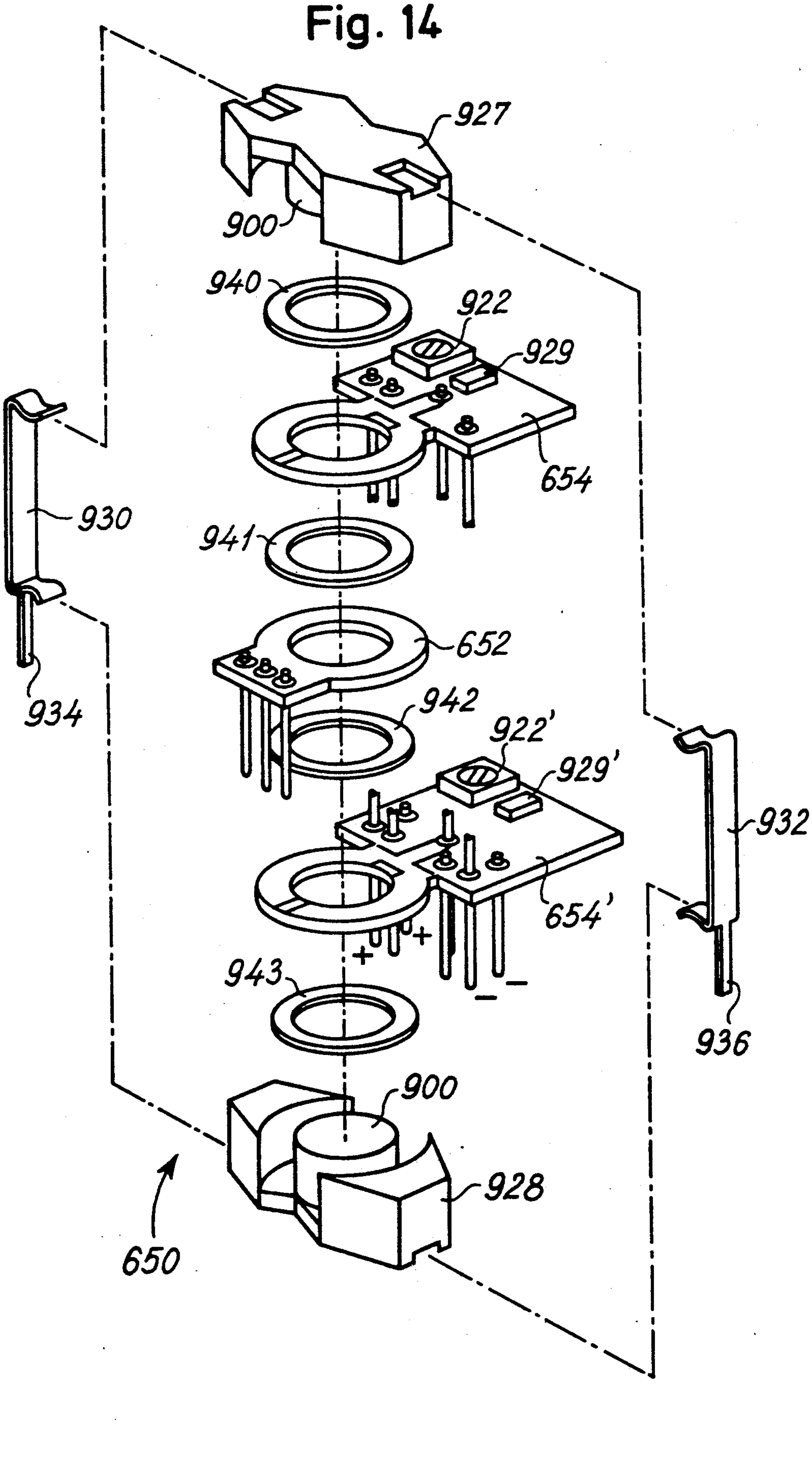
Figure 15A:
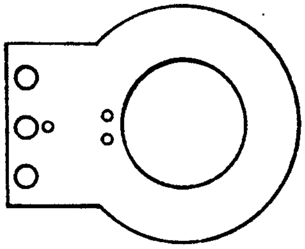
Figure 15B:
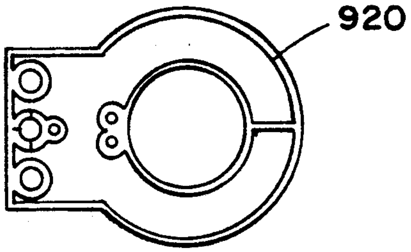
Figure 15C:
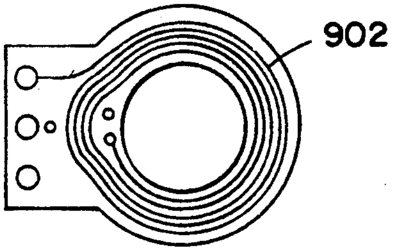
Figure 15D:
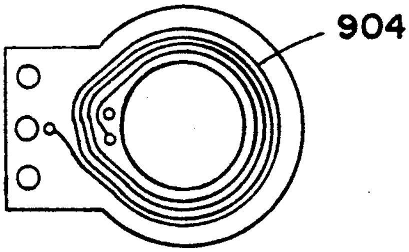
Figure 15E:
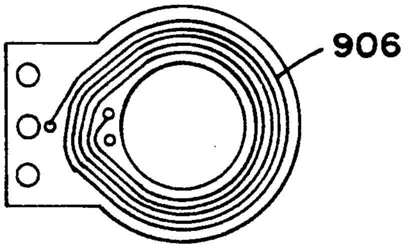
Figure 15F:
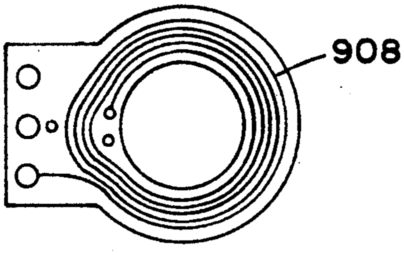
Figure 15G:
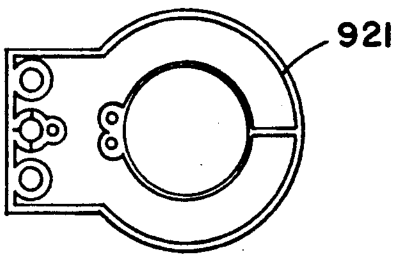
Figure 15H:
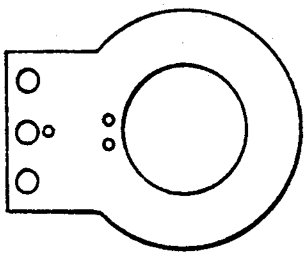
Figure 16A:
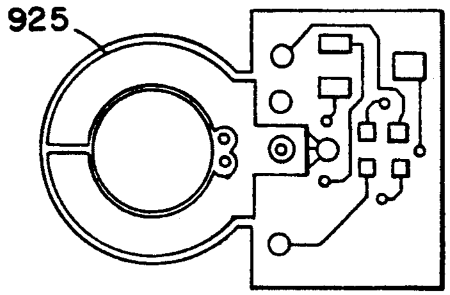
Figure 16B:
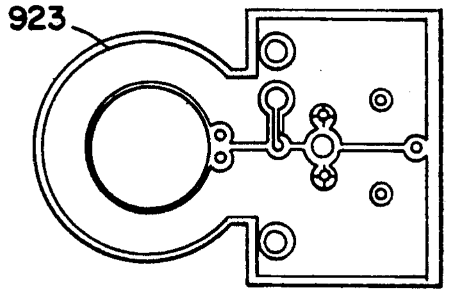
Figure 16C:
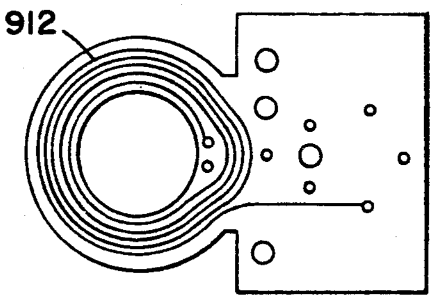
Figure 16D:
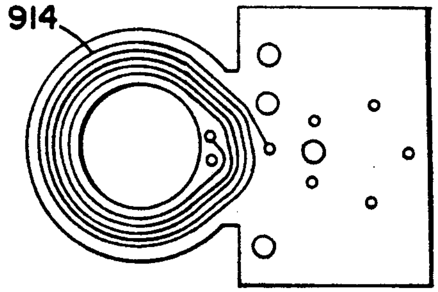
Figure 16E:
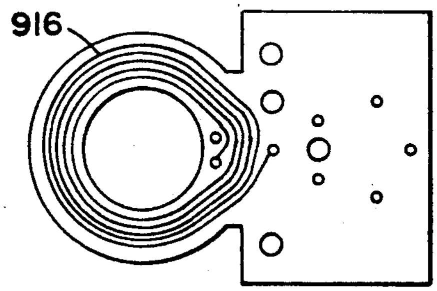
Figure 16F:
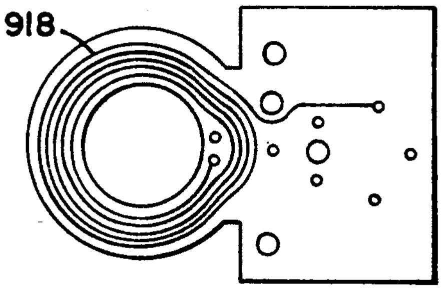
Figure 16G:
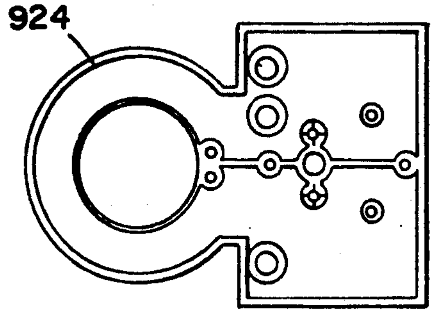
Figure 16H:
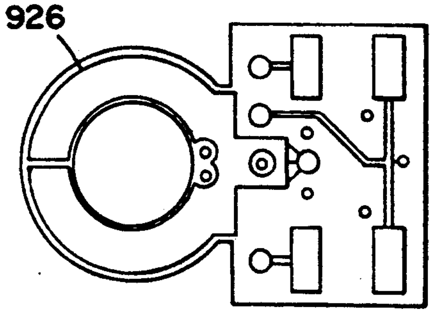
Figure 17A:
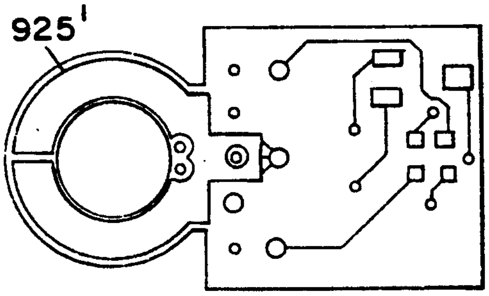
Figure 17B:
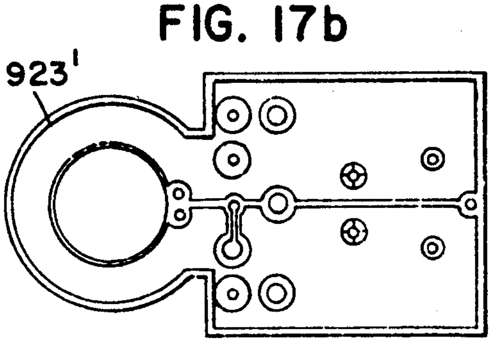
Figure 17C:
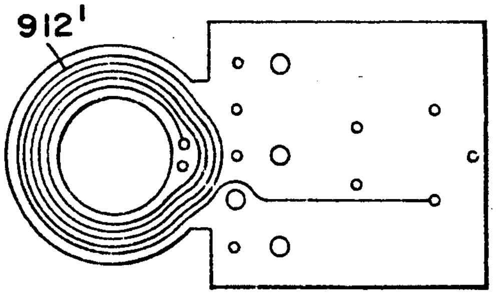
Figure 17D:
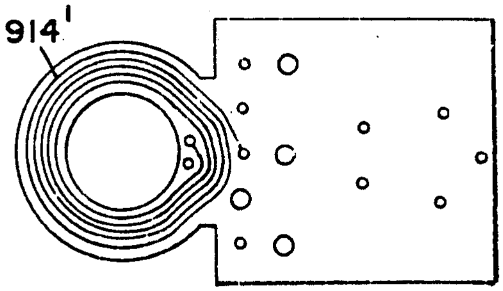
Figure 17E:
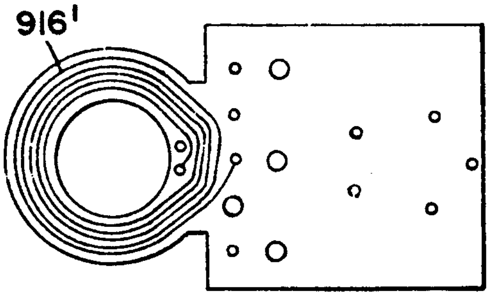
Figure 17F:
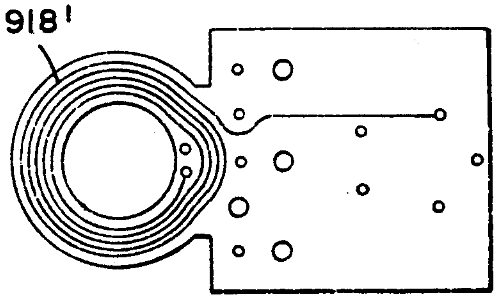
Figure 17G:
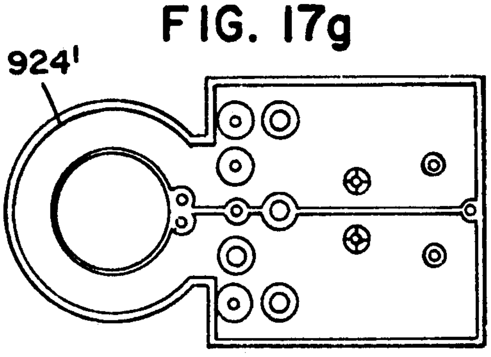
Figure 17H:
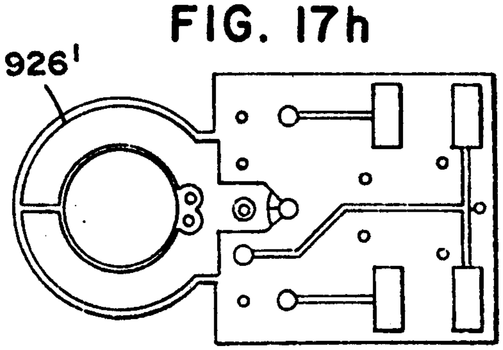
Figure 19:
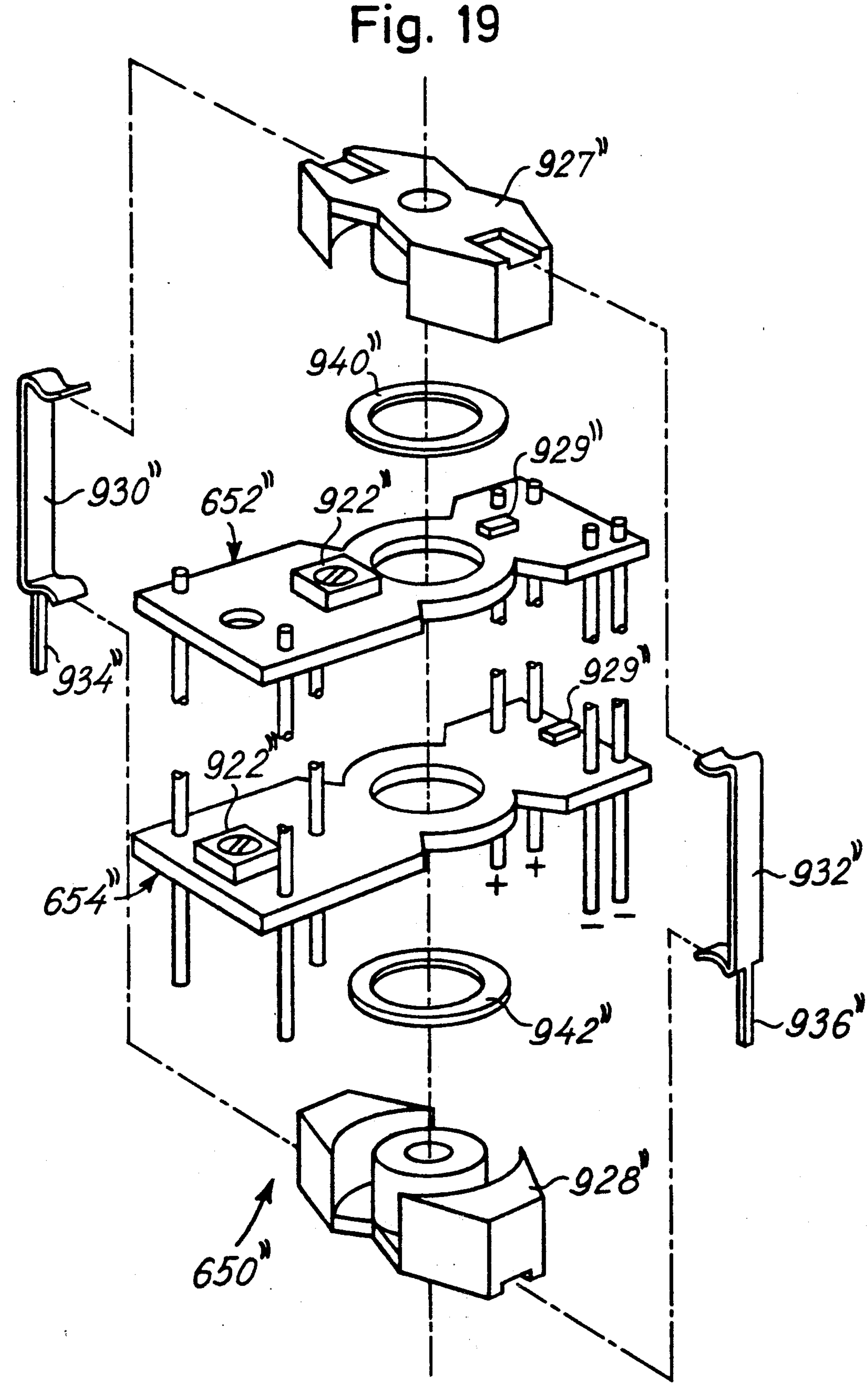
Figure 20A:
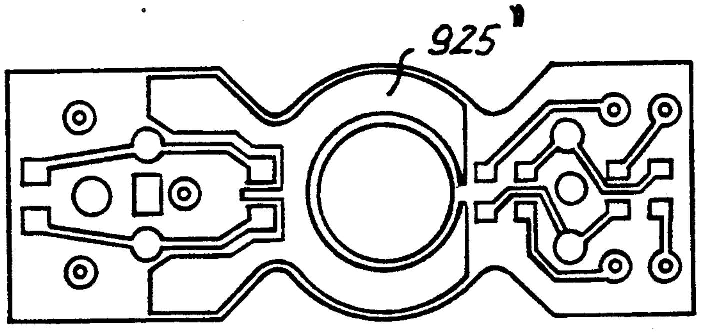
Figure 20B:
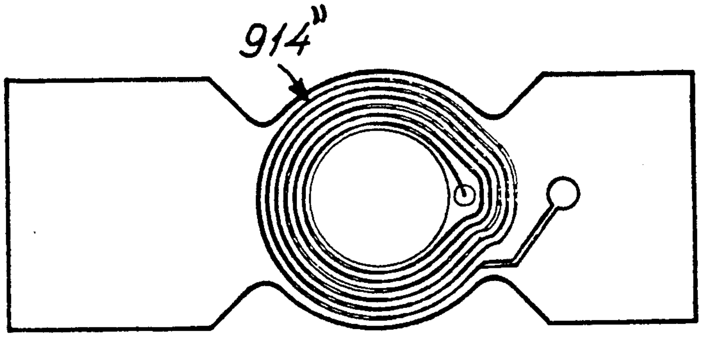
Figure 20C:
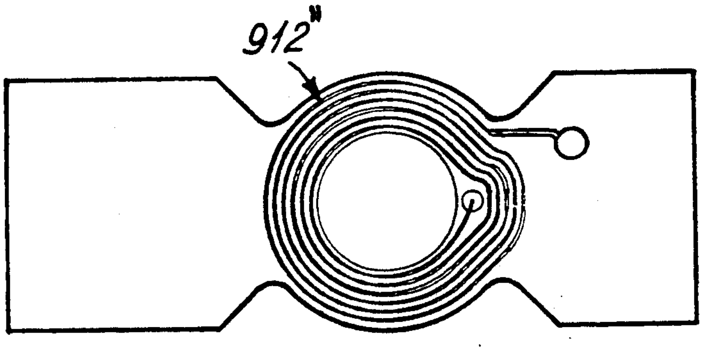
Figure 20D:
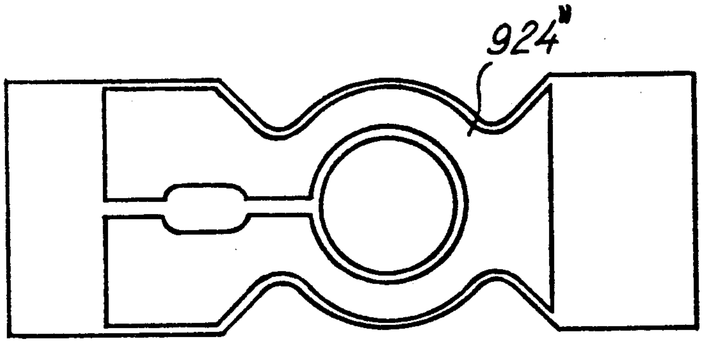
Figure 20E:
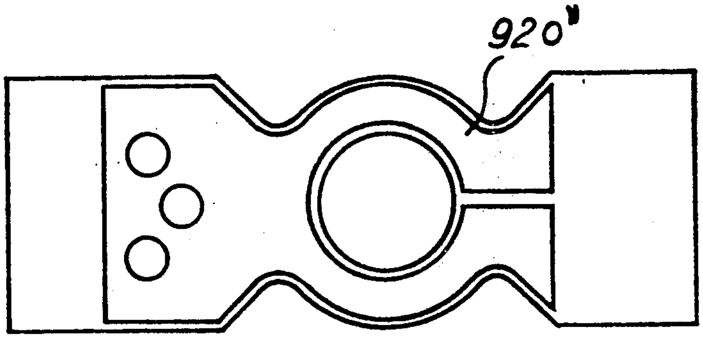
Figure 20F:
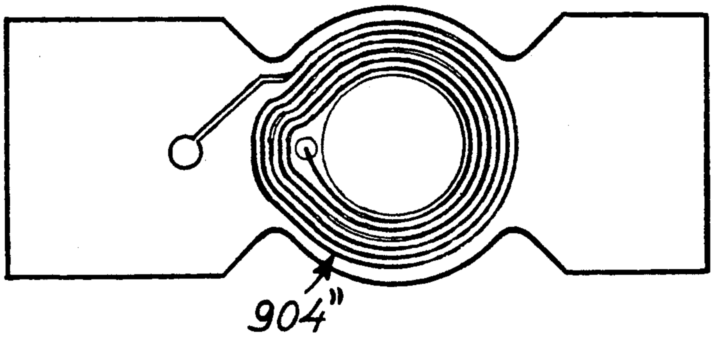
Figure 20G:
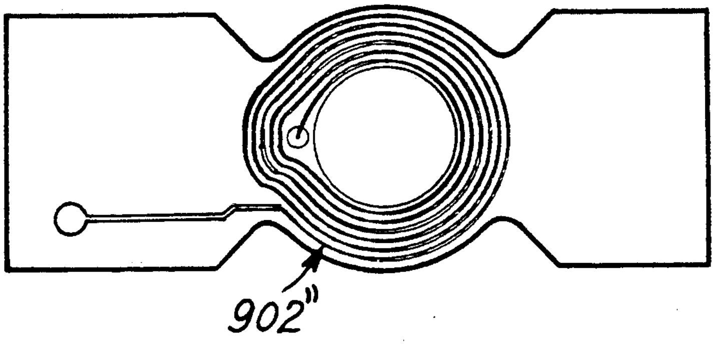
Figure 20H:
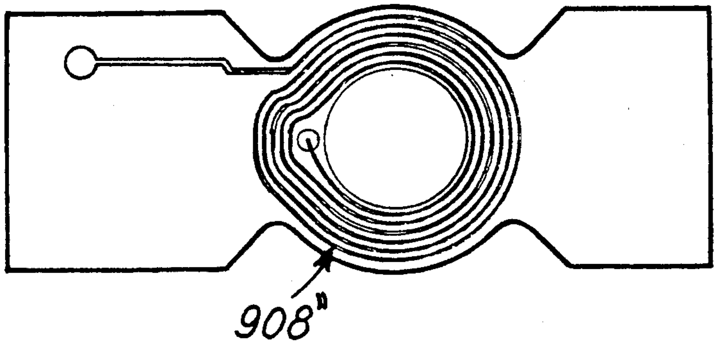
Figure 20J:
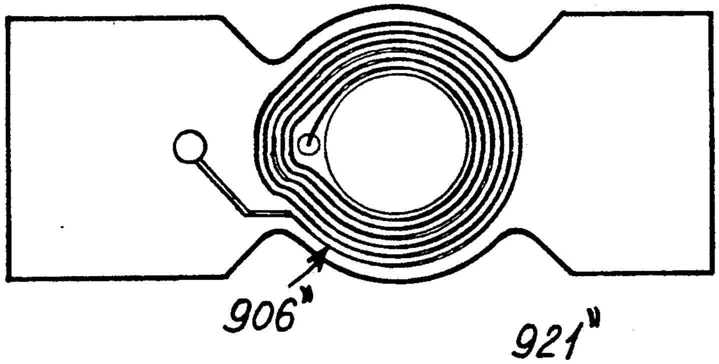
Figure 20K:
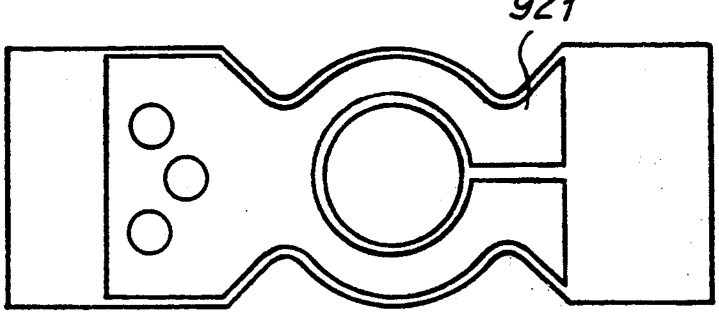
Figure 20L:
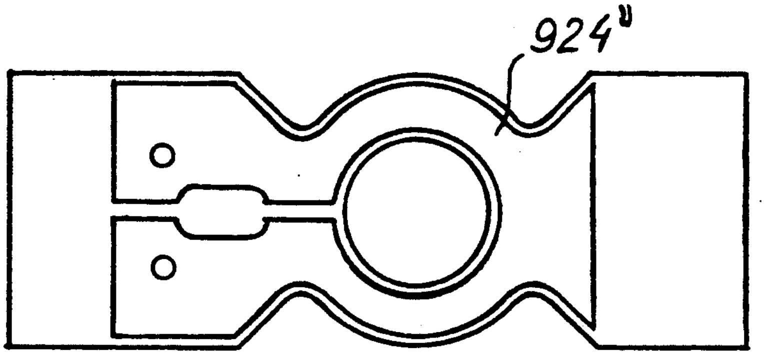
Figure 20M:
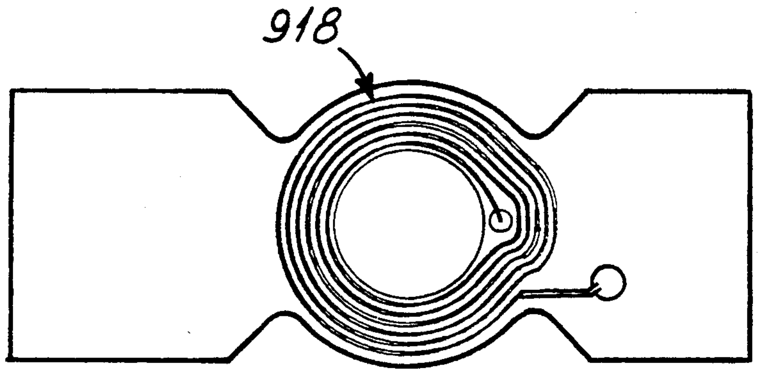
Figure 20N:
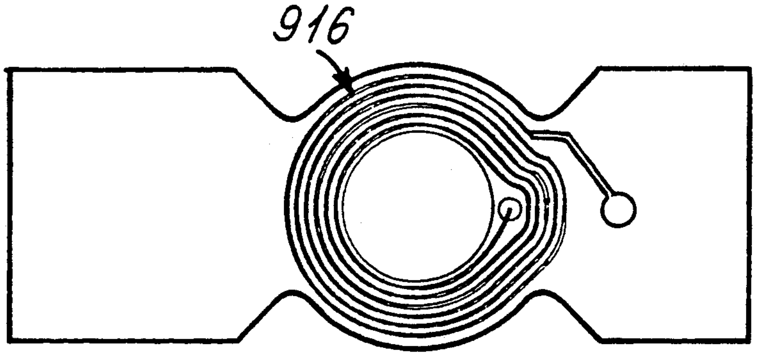
Figure 20O:
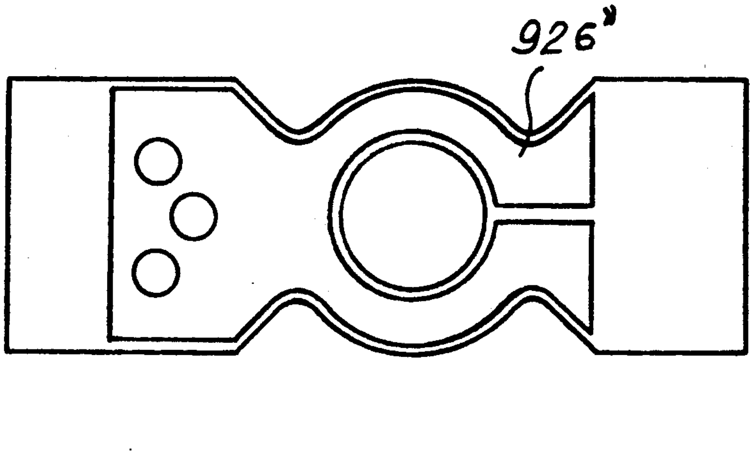

A preferred embodiment of an audio signal switching system and components thereof are now to be described in greater detail with reference to the drawings, in which FIGS. 1 and 2 are front and rear views, respectively, of an audio signal switching system according to the present invention encased within a housing, FIG. 3 is in overall schematic view of an audio signal switching system according to the present invention comprising separate input sections, separate crosspoint sections and separate output sections optionally directly connectable to separation input sections, FIG. 4 is a schematic view of an input section of the system shown in FIG. 3, FIG. 5 is a diagrammatical view of a single transformer coupled amplifier section of the input section shown in FIG. 4, FIG. 6 is a diagrammatical view of the crosspoint section of the system shown in FIG. 3, FIG. 7 is a diagrammatical view of a first part of the output section of the system shown in FIG. 3, FIG. 8 is a diagrammatical view of a second part or a switch mode power supply part of the output section of the system shown in FIG. 3, FIG. 9 is a diagrammatical view of a symmetrical output stage of the output section of the system shown in FIG. 3, FIGS. 10, 11 and 12 are perspective views of the input section, the crosspoint section and the output section, respectively, of the system shown in FIG. 3, and shown in greater detail is FIGS. 4–9 implemented in electronic circuits provided on printed circuit boards, FIG. 13 is a diagrammatical view of a switch mode power supply assembly 650 shown, FIG. 14 is a perspective view of the switch mode power supply transformer shown in FIG. 13, FIGS. 15*a, b, c, d, e, f, g* and *h* are diagrammatical views of individual layers of the primary section of the switch mode power supply transformer shown in FIG. 14 and implemented in multilayer technique, FIG. 15*a* shows a top terminal layer, FIG. 15*b* shows a layer constituting screen 920, FIG. 15*c* shows a layer of primary winding 902, FIG. 15*d* shows a layer of primary winding 904, FIG. 15*e* shows a layer of primary winding 906, FIG. 15*f* shows a layer of primary winding 908, FIG. 15*g* shows a layer of primary winding 921, FIG. 15*h* shows a bottom terminal layer, FIGS. 16*a, b, c, d, e, f, g* and *h* are diagrammatical views of individual layers of the first secondary section of the switch mode power supply transformer shown in FIG. 14 and implemented in multilayer technique, FIG. 16*a* shows outer top layer 925, FIG. 16*b* shows a layer constituting screen 923, FIG. 16*c* shows a layer of secondary winding 912, FIG. 16*d* shows a layer of secondary winding 914, FIG. 16*e* shows a layer of secondary winding 916, FIG. 16*f* shows a layer of secondary winding 918, FIG. 16*g* shows a layer of screen 924, FIG. 16*h* shows an outer bottom layer, FIGS. 17*a, b, c, d, e, f, g* and *h* are diagrammatical views of individual layers of the second secondary section of the switch mode power supply transformer shown in FIG. 14 and implemented in multilayer technique, FIG. 17*a* shows outer top layer 925', FIG. 17*b* shows a layer of screen 923', FIG. 17*c* shows a layer of secondary winding 912', FIG. 17*d* shows a layer of secondary winding 914', FIG. 17*e* shows a layer of secondary winding 916', FIG. 17*f* shows a layer of secondary winding 918', FIG. 17*g* shows a layer of screen 924', FIG. 17*h* shows an outer bottom layer, FIG. 18 is a diagrammatical view of an alternative embodiment of the switch mode power supply transformer shown in FIG. 13, FIG. 19 is a perspective view of the switch mode power supply transformer 650'' shown in FIG. 18, FIG. 20*a, b, c, d, e, f, g, h, i, j, k, l, m, n* and *o* are diagrammatical views of individual layers of the switch mode power supply transformer 650'' shown in FIG. 19 and implemented in multilayer technique, and FIG. 20*a* shows top layer 925'', FIG. 20*b* shows a layer of first secondary winding 914'', FIG. 20*c* shows a layer of second secondary winding 912'', FIG. 20*d* shows secondary winding screen 924'', FIG. 20*e* shows internal screen 920″, FIG. 20*f* shows a layer of second primary winding 904″, FIG. 20*g* shows a layer of first primary winding 902″, FIG. 20*h* shows a layer of fourth primary winding 908″, FIG. 20*j* shows a layer of third primary winding 906″, FIG. 20*k* shows internal screen 921″, FIG. 20*l* shows secondary winding screen 924″, FIG. 20*m* shows a layer of fourth secondary winding 918″, FIG. 20*n* shows a layer of third secondary winding 916″, FIG. 20*o* shows screen 926″.

In FIG. 3, an overall schematic view of a presently preferred concept of implementing an audio signal switching system according to the present invention is shown. The system according to the present invention is designated the reference numeral 300 in its entirety and is, as is evident, from FIG. 3, of a modular structure. Thus, the audio signal switching system 300 basically comprises three sections, viz. an input section 302, a crosspoint section 304 and an output section 306. Each input section 302 constitutes a printed circuit board shown in FIG. 10 and includes a total of sixteen input channels. Each crosspoint section 304 constitutes a printed circuit board shown in greater detail in FIG. 11 and includes a total of sixtyfour inputs and eight outputs for connection to a maximum of four input sections or input cards 302 and to a single output section 306, which also constitutes a single printed circuit board shown in greater details in FIG. 12.

The output section or card 306 is provided with a total of eight outputs and is apart from its eight inputs connectable to a single crosspoint section or crosspoint card 304 provided with thirtytwo inputs constituting thirtytwo separate crosspoint inputs similar to the crosspoint inputs of the crosspoint section 304, which crosspoint inputs of the output section 306 are connectable to two input sections 302, as shown in the lower left hand part of FIG. 3. In a single audio signal switching system comprising six input sections or input cards 302, twentyfour crosspoint sections or cards 304 and further twentyfour output sections or output cards 306, the thirtytwo crosspoint inputs of which are connected directly to two input sections or cards 302, a system comprising ninetysix inputs and a hundred and ninetytwo outputs is provided.

In the system, any input of the ninetysix inputs is switchable to and connectable to any of the outputs of the one hundred and ninetytwo outputs and further any number of these on hundred and ninetytwo outputs. The above system comprising a total of six input sections 302, twentyfour crosspoint sections 304 and twentyfour output sections 306 may be encased within a 19″ housing measuring six standard rack units (6×1¾″). As will be readily understood, the 96×192 audio signal switching system is of an extremely compact structure contrary to the known bulky crosspoint or routing switcher systems.

It is to be pointed out that the modular structure of the audio signal switching system according to the present invention allows that even larger systems may be implemented, as the heart of the audio signal switching system according to the present invention is a 96×192 crosspoint matrix, to which more than ninetysix input channels may be interfaced through an appropriate number of input sections or input cards and an appropriate number crosspoint cards, and to which even more than one hundred and ninetytwo output channels may be interfaced through an appropriate number of crosspoint cards and output cards.

Obviously, a smaller audio signal switching system, such as a system comprising sixteen inputs and eight outputs and including a single input section or input card 302 and a single output section or output card 360, may also be implemented in accordance with the teachings of the present invention.

In the implementation of the audio signal switching system according to the present invention to be described below, the signal levels, i.e. the input and the output levels of audio signal switching system, are conventional studio line levels, i.e. +6 dBm (0 dBm=0.775 V, 1 mW/600 Ω). All input and output levels are balanced, symmetrical and ungrounded for galvanically separating the input sources from the switching system and further for galvanically separating the switching system from the inputs of the receivers, to which the signals are routed or switched. The sources and the receivers may constitute conventional studio equipment constituting monophonic, stereophonic, biaural, quadrophonic, surround sound, multichannel, e.g. 4, 8, 16 or 24 channels or tracks, systems, sources and receivers.

In FIG. 4, the input section or input card 302 is shown in greater detail. The input section 302 comprises sixteen individual and identical channels each comprising an input relay 310 and a transformer coupled, zerofield amplifier stage 312 to be described in greater details below with refreeze to FIG. 5. Apart from its sixteen input channels, the input section 302 is provided with a separate test input channel designated the reference numeral 314. The input section 302 further comprises two decoders and addressing sections 316 and 322, respectively, which each comprises two decoders 318 and 320 and two analog multiplexers 324 and 326, respectively. The decoders 318 and 320 and the multiplexers 324 and 326 are addressed from addressing lines shown in the right-hand part of FIG. 4. The input section 302 shown in FIG. 4 operates in the following manner. Provided e.g. input channel number one is to be switched through an output of the audio signal switching system 300 shown in FIG. 3, a code is input to the decoders 318 and 320, which code is decoded by the decoders 318 and 320 resulting in that the input relay 310 of input channel number one switches the terminals of the input channel number one to the inputs of the amplifier stages 312 of input channel number one. In the amplifier stages 312 of the input channel number one, the symmetrical and balanced input signal is converted into an unbalanced and unsymmetrical signal, which is output to one of the terminals shown in the lower right-hand part of FIG. 4, which terminals are designated the reference numeral 328 and constitute the outputs of the input section 302.

In case e.g. input channel number one is to be tested, the code input to the decoders 318 and 320 results in that a test signal input to the input channel 314 is switched through the input relay 310 of the input channel number one, debalanced within the amplifier stage 312 of input channel number one and output from an output of the multiplexers 324 and 326, which output is connected to a testpoint, and which decoders are also addressed in this test routine.

In FIG. 5, one of the transformer coupled, zerofield amplifier stages 312 is shown in greater detail. The amplifier stage is basically of a structure as disclosed in published DE OS 27 10 291 and comprises an input transformer 330 comprising a single primary winding and a single secondary winding. The terminals of the primary winding of the input transformer 330 are connected to the input terminals of the amplifier stage 312 through resistors 331 and 332. The secondary winding of the input transformer 330 is in the zerofield operational mode of the amplifier stage 312 short-circuited by an extremely low load provided by an inverting operational amplifier stage including an operational amplifier 336, a feedback resistor 338 and a band width limiting capacitor 340, an output resistor 342 and two resistors 334 and 346. The resistive load of the transformer 330, results in that a finite impedance is, however, presented to the amplifier 336. For compensating this finite yet small impedance, an impedance compensation network is provided generating a negative impedance at the input of the amplifier 336. The impedance compensation network comprises a resistor 344 interconnecting the output of the operation amplifier 336 and the non-inverting input thereof and three resistors 348, 350 and 352 and further a variable resistor 354. Across the terminals of the secondary winding of the input transformer 330, a capacitor 360 is connected. For DC stabilizing the electronic circuits 312, a DC servo is further provided comprising an operational amplifier 362, a feedback capacitor 364 and a resistors 368.

In FIG. 6, the crosspoint section 304 is shown in greater detail. The crosspoint section 304 comprises a total of four 8×16 analog switch arrays, one of which is designated the reference numeral 400. Thus, each of the switch arrays 400 includes sixteen inputs and eight outputs, from which inputs to which outputs a short-circuiting connection may be established by addressing an appropriate analog switch of the switch arrays, which addressing is performed by a decoding and addressing section 402 shown in the upper left-hand part of FIG. 6. The decoding and addressing section 402 operates in a manner similar to the above described manner, in which the decoding and addressing sections 316 and 322 shown in FIG. 4 operate. The decoding section 402 comprises two decoders 404 and 406. Each of the 8×16 analog switch arrays 400 has its outputs connected to respective inputs of respective amplifier stages, one of which constituting an amplifier stage number one is shown in greater detail and designated the reference numeral 410. The amplifier stage 410 comprises two operational amplifiers 412 and 414, which generate a symmetrical signal from the input signal supplied to the non-inverting input and the inverting input of the operational amplifiers 412 and 414, respectively. The outputs of the operational amplifiers 412 and 414 are connected to a semiconductor switch element 416, which is addressed from a further decoder 408, which addresses the switch element 416 of the amplifier stage in question provided one of the 8×16 analog switch arrays 400 establishes electrically conductive connection from one of its inputs tot he output of the analog switch array in question, which output is connected to the input of the amplifier stage in equation. The outputs of the switch element 416 constitute a symmetrical output line from the crosspoint channel in question. The crosspoint channel number one is designated the reference numeral 420. The crosspoint section 304 further comprises a decoder and addressing block 422 serving the same purpose as the decoders 324 and 326 of the decoding and addressing block 328 shown in FIG. 4, viz. the purpose of providing access to the outputs of any of the crosspoint output channels, from an external testpoint.

In FIG. 7, the output section 306 is shown in greater detail. As discussed above, the output section 306 also shown in FIG. 3 includes a crosspoint section connectable to two input sections 302, which crosspoint section is identical to one half of the crosspoint section 304 discussed above with reference to FIG. 6. In FIG. 7, the crosspoint section of the output card 306 is designated the reference numeral 304' in its entirety, and the individual components of the crosspoint section 304' are designated the same reference numerals as the components of the crosspoint section 304 shown in FIG. 6, however, added a reference mark. The eight symmetrical output lines 420' form the amplifier stages 420' of the crosspoint section 304' constitute eight symmetrical busses, which are connected to corresponding inputs of eight output section channels.

The symmetrical busses connected to the outputs 420' are further connected to terminals 440, which are shown in the lower left-hand part of FIG. 7, and which terminals 440 constitute input terminals for connection to the symmetrical output terminals 420 of the crosspoint section 304 shown in FIG. 6. The symmetrical busses connected to the output terminals 420' and further to the input terminals 440 are connected to respective, symmetrical inputs of transformer coupled, zerofield amplifier stages 450 of the eight output section channels. The transformer coupled, zerofield amplifier stages 450 are of a structure identical to the structure of the above described zerofield amplifier stages 312 shown in FIG. 4.

The outputs of the amplifier stages 450 are connected through a capacitor 452 and two resistors 454 and 456 to inputs of respective, symmetrical output stages 460, one of which is shown in greater detail in FIG. 9. The transformer coupled, zerofield output stage 450 and the symmetrical output stage 460 of one of the output channels of the output section 306 is connected to a separate switch mode power supply section of a switch mode power supply shown in FIG. 8. Each separate power supply section of the switch mode power supply shown in FIG. 8 comprises a separate switch mode power supply transformer, which together with the input transformer of the transformer coupled, zerofield amplifier stage 450 and with an optocoupler 480 provide a galvanic separation of the entire output channel from the busses and consequently the crosspoint sections and the input sections and from the remaining output channels.

In FIG. 7, reference signs +and −of the amplifier stages 450 and 460 identify the positive and negative supply terminals of the stages, which terminals are connected to respective positive and negative supply terminals of the separate switch mode power supply section to be described below with reference to FIG. 8. The symmetrical output stage 460 further includes in a power supply section a Zener diode 462, which Zener diode 462 is connected in parallel with a capacitor 464, and an NPN transistor 466 which is connected to respective terminals of the symmetrical output stage 460, to the positive and negative supply terminals and an internal ground designated the reference numeral 470 through three resistors 472, 474 and 476.

The optocoupler 480 constitutes an interface between a control terminals of the symmetrical output stage 460 and a decoding and addressing block 490. A part from the decoding and addressing block 490, a further decoding and addressing block 492 is provided, which decoding and addressing block 492 addresses respective output relays 494, by which a test signal input to a pair of input terminals 496 may be routed to output terminals 498 of the output channel in question or, alternatively, to which terminals 496, a symmetrical output signal supplied to the output terminals 498 of the output channel in question may be monitored through the output relay 494. The decoding and addressing block 492 consequently serves a purpose similar to that of the decoding and addressing blocks 422 and 422'.

The decoding and addressing block 490 serves a somewhat different purpose, viz. the purpose of muting the symmetrical output stage 460, while a switching operation involving the output channel and consequently the output stage in question is carried out.

In FIG. 8, the above mentioned switch mode power supply is shown designated the reference numeral 600 in its entirety. The switch mode power supply comprises an oscillator circuit 602, which supplies a symmetrical output signal from a non-inverting input and an inverting input to respective, symmetrical predriver stages 604 and 606, respectively, which predriver stages 604 and 606 each comprise an NPN transistor 608 and 610, respectively, and a PNP transistor 612 and 614, respectively. The node of the emitters of the transistors 608, 612 and 610, 614 of the predriver stages 604 and 606, respectively, are connected to symmetrical MOSFET power output stages 616 and 618, respectively, which MOSFET power output stages comprise symmetrical MOSFET output transistors 620, 622 and 624, 626, respectively. The MOSFET power output stages 616 and 618 are supplied from an external positive power supply source through an inductor 630, through which electrical power is further supplied to the predriver stages 604 and 606, and to the oscillator block 602 through an appropriate smoothing and voltage divider network, not shown in FIG. 8.

The outputs of the symmetrical power output stages 616 and 618 are connected to respective terminals of a total of four switch mode power supply transformer assemblies, one of which is designated the reference numeral 650. Each of the assemblies 650 includes one primary section 652 and two secondary sections 654 and 654' each implemented in multilayer technique. The sections 652, 654 and 654' are mounted on a common core of the assembly 650 and have the primary windings connected to the above terminals of the assembly 650, which terminals are further connected to the outputs of the power output stages 616 and 618. As will be readily understood, a total of four primary sections and eight secondary sections are provided in a total of four switch mode power supply transformer assemblies 650.

In an alternative embodiment 650'' of the switch mode power supply transformer each of the assemblies 650'' includes two transformers implemented in multilayer technique, which transformers are designated the reference numerals 652'' and 654'', respectively. The transformers 652'' and 654'' are mounted on a common core of the assembly 650'' and have their primary windings connected in parallel to the above terminals of the assembly 650'', which terminals are further connected to the outputs of the power output stages 616 and 618. As will be readily understood, a total of eight transformers 652'', 654'' are provided in a total of four switch mode power supply transformer assemblies 65041 , which individual transformers 652'', 654'' constitute a switch mode power supply transformer of the power supply section of a separate output channel of the output section 306, and which transformers 652'', 654'' provide the above discussed galvanic separation.

In FIG. 9, the output stage 460 shown in FIG. 7 is disclosed in greater details. The symmetrical output stage 460 comprises two FET-transistors 702 and 704, which constitute muting transistors serving the purpose of muting any signals at the input of the output stage 460 during a switching operation involving the output stage in question. The symmetrical output stage 460 further comprises two operational amplifiers 706 and 708, the outputs of which are connected to a respective two-stage, symmetrical low impedance power output stage each comprising a biasing network including a PNP-transistor 710 and 714, respectively, and an NPN-transistor 712 and 716, respectively, and an output stage including an NPN-transistor 718 and 722, respectively, and a PNP-transistor 720 and 724, respectively. The emitters of the output transistors 718, 722 and the transistors 722 and 724 are connected to output terminals 498 through emitter resistors and output resistors as shown in FIGS. 7 and 9 and designated the reference numerals 730 and 734.

Figure 10:
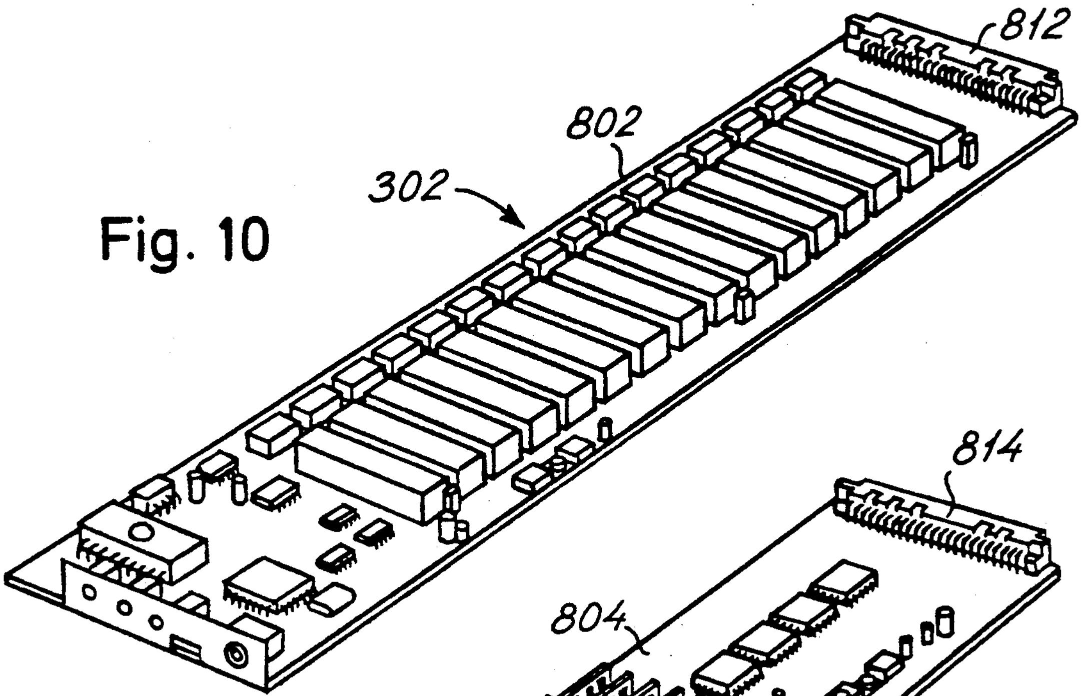
Figure 11:
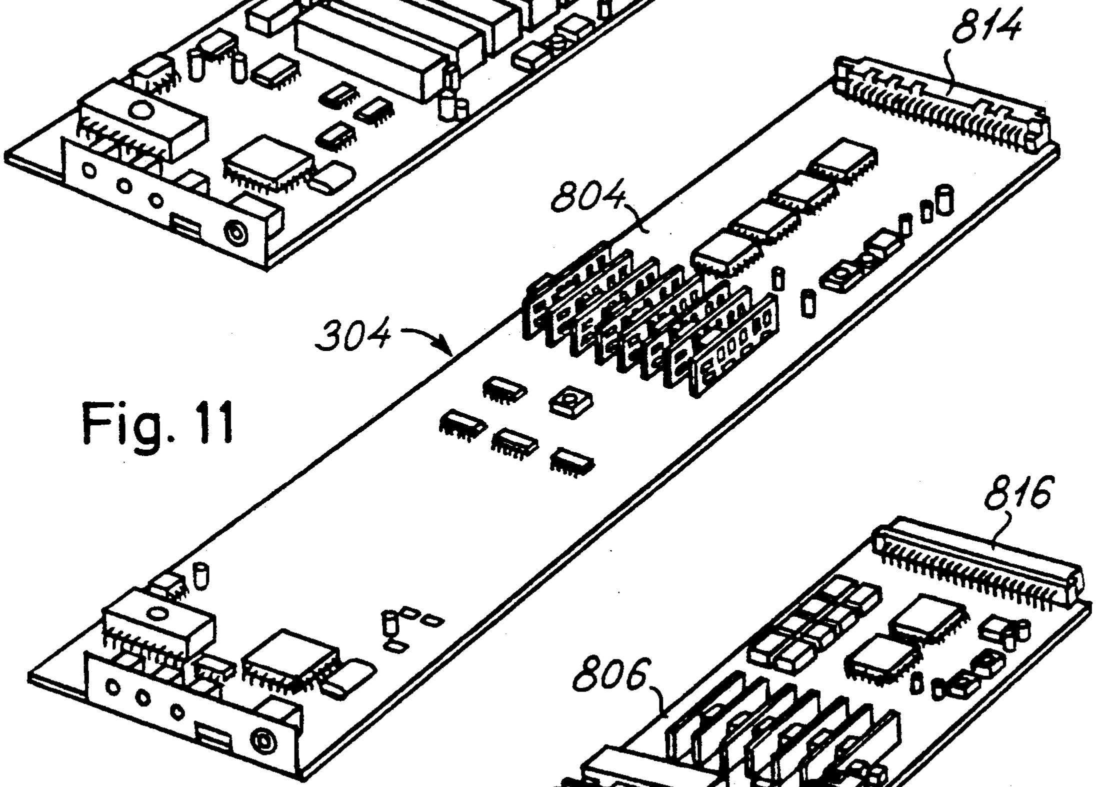
Figure 12:
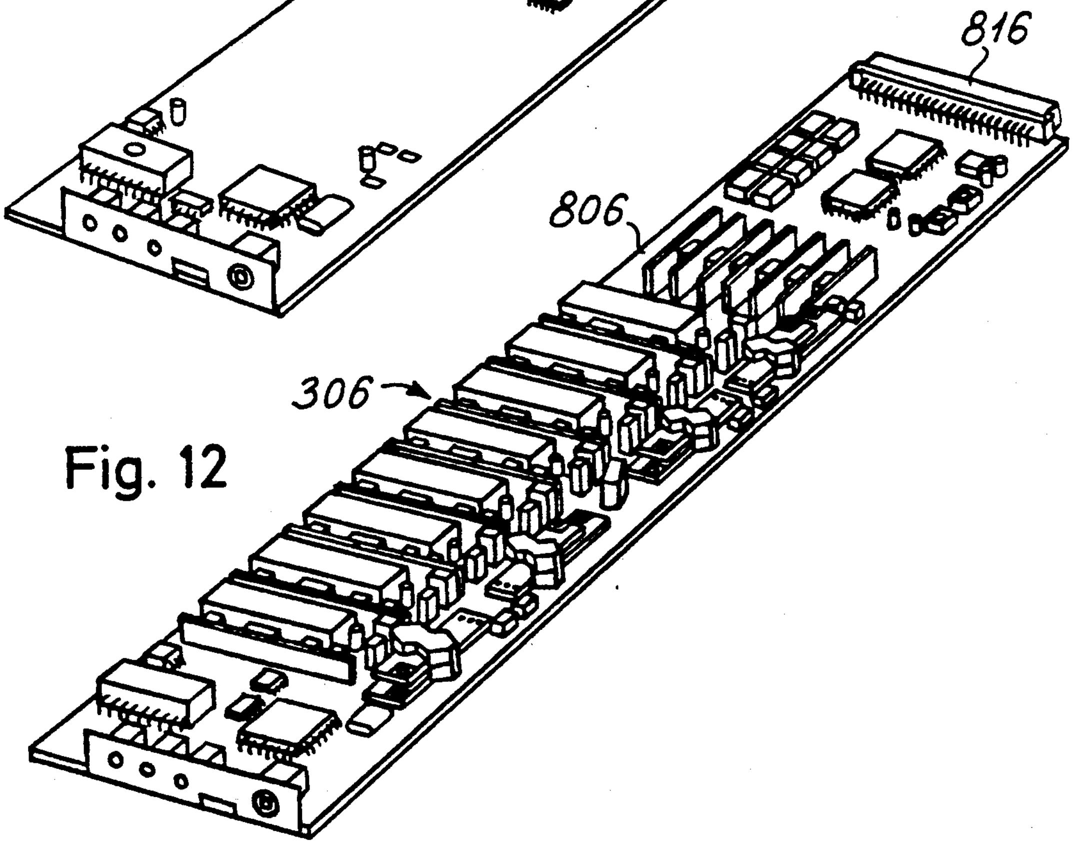

In FIGS. 10, 11, and 12, the above discussed input section 302, crosspoint section 304 and output section 306 are shown implemented as electronic circuits mounted on double-side printed circuit boards designated the reference numerals 802, 804 and 806, respectively. Each of the printed circuit boards 802, 804 and 806 constitutes a printed circuit board of a width of approximately 100 mm for cooperating with a standard Eurocard receiving rack frame system of the type shown in FIGS. 1 and 2 and of a length of approximately 370 mm. At one end of the printed circuit boards 802, 804 and 806, multipin connectors 812, 814 and 816, respectively, are provided. The multipin connectors 812, 814, 816 are adapted to cooperate with corresponding receiving female terminal circuits of the above mentioned rack mounting system.

In the schematic views of FIGS. 10–12, specific components of the electronic circuities discussed above with reference to FIGS. 4–9 are further identified with reference numerals identical to the reference numerals used in FIGS. 4–9.

In FIGS. 1 and 2, a perspective front and a schematic rear view, respectively, of a housing 100 are shown, in which housing 100 three 3-unit high (5.25" high×19" wide) housings 102, 104, 106 are received. Within the housings 102 and 104, the circuit boards 802, 804 and 806 constituting sections 302, 304 and 306, respectively, of the audio signal switching system according to the present invention are received. In the bottom housing 106, two commercially available 24V power supply units 130 and 134 are received. The rear view of the housing 100 shown in FIG. 2 discloses an AC, 220V 50 Hz mains supply input lug 110, a control signal input terminal 112 for receiving data constituting control signals for controlling the switching operations of the audio signal switching system, as will be evident from the discussion above, and further a multipin plug 114 for connection to external inputs and outputs of external remote equipment via a multicore cable 116, which equipment is interfaced through the audio signal switching system according to the present invention, as in a conventional crossfield or crosspoint system well-known within the professional audio field per se. A PC 118 is further shown, which PC 118 communicates with the audio signal switching system through the control signal input terminal 112 for controlling the overall operation of the switching system and further optional control panels 120 and 122, which may be located at remote locations and communicate with the PC 118 or alternatively with a mainframe computer 124 and further the audio signal switching system according to the present invention through a data bus 126.

In FIG. 13, a diagram of a switch mode power supply assembly 650 is shown. The switch mode power supply assembly 650 comprises a primary section 652 constituted by four separate layers 902, 904, 906 and 908 including primary windings and two screens 920 and 921, which are connected to ground, a first secondary section 654 constituted by four separate layers 912, 914, 916 and 918 including secondary windings and two screens 925, which are connected to ground, and includes two internal screens 923 and 924, which are connected to a potentiometer 922 and a second secondary section 654' constituted by four separate layers 912', 914', 916' and 918' including secondary windings and two screens 925', which are connected to ground includes two internal screens 923' and 924', which are connected to a potentiometer 922'. The assembly 650 constitutes a 19:20 high frequency transformer. It has been realized that the provision of the screens and further the potentiometer 922 and 922', respectively renders it possible to reduce the capacitive coupling to extremely low levels, which further reduces the injection of noise into the electronic circuitry supplied from the transformer. The secondary windings of the first secondary section 654 comprising the individual secondary windings 912, 914, 916 and 918 are connected to a full bridge rectifier 929, which output terminals are connected to the smoothing network consisting of two capacitors 944 and 946. The secondary windings of the second secondary section 654' comprising the individual secondary windings 912', 914', 916' and 918' are connected to a full bridge rectifier 929', which output terminals are connected to the smoothing network consisting of two capacitors 944' and 946'. The capacitors define the positive and negative supply terminals of the power supply section in question and further define an internal ground terminal which is separated form the group terminals of the remaining separate channels and further from the remaining electronic circuit of the entire system.

In FIG. 14, an exploded view of the switch mode power supply transformer assembly 650 is shown comprising one primary section 652 and two secondary sections 654 and 654', respectively, which each has a multilayer structure to be described in greater detail below. Each of the secondary sections are provided with a separate potentiometer 922 and 922', respectively and a separate full bridge rectifier 929 and 929', respectively. The assembly 650 further comprises two housing parts 927 and 928, which constitute the core 900 of the transformer, and which are arranged receiving the primary section 652 and the secondary sections 654 and 654', respectively in recesses of the housing components and clamped together by means of clamping and locking springs 930 and 932, which are further connected with soldering lugs 934 and 936, respectively. In the assembly 650, four washers 940, 941, 942 and 943 are further provided.

The primary section 652 and the two secondary sections 654 and 654' of the switch mode power supply transformer assembly 650 have each a multilayer structure of eight layers. The primary section 652 includes primary winding layers 902, 904, 906 and 908, provisions for establishing electrically conductive connection between the individual layers of the multilayer component and screen layers 920 and 921. The first secondary section 654 include secondary windings 912, 914, 916 and 918, screens layers 923, 924 and 925, provisions for establishing electrically conductive connection between individual layers of the multilayer component, and further provisions for receiving the potentiometer 922 and the full bridge rectifier 929, as well as provisions for receiving two capacitors 944 and 946 for smoothing the output voltage from the full bridge rectifier. The second secondary section 654' include secondary windings 912', 914', 916' and 918', screens layers 923', 924' and 925', provisions for establishing electrically conductive connection between individual layers of the multilayer component, and further provisions for receiving the potentiometer 922' and the full bridge rectifier 929', as well as provisions for receiving two capacitors 944' and 946' for smoothing the output voltage from the full bridge rectifier.

In FIG. **15*a*–*h*, the individual layers of the multilayer primary section 652 are shown. In FIG. 15*a* and FIG. 15*h*, top and bottom layers constituting terminal layers are shown. In FIGS. 15*b* and FIG. 15*g*, layers constituting screens 920 and 921 are shown. In FIG. 15*c*, FIG. 15*e*, and FIG. 15*f*, layers of primary windings 902, 906 and 908 with five windings in each layer are shown. In FIG. 15*e* a layer of primary winding 904** with four windings is shown.

In FIG. **16*a*–*h*, the individual layers of the first multilayer secondary section 654 are shown. In FIG. 16*a*, an outer top layer 925 constituting a terminal layer is shown, which outer top layer is provided with terminal fields for receiving the potentiometer 922 and the full bridge rectifier 929 in two individual positions as shown in FIG. 14 and which top layer also constitutes a screen layer 925, shown in FIG. 13. In FIG. 16*b* and FIG. 16*g*, screens 923 and 024 are shown. The screens 923 and 924 are shown as windings in FIG. 13, because the screens encircle the core and thereby function as windings. The main purpose of the screens 923 and 924 is however to screen. In FIG. 16*c*, FIG. 16*d*, FIG. 16*e* and FIG. 16*f*, secondary windings 912, 914, 916 and 918 respectively, with five windings are shown. In FIG. 16*h*, an outer bottom layer constituting a terminal layer is shown, which layer is provided with terminal fields for receiving two capacitors 944 and 946, shown in FIG. 13 and which bottom layer also constitutes a screen layer 925, shown in FIG. 13. By adjusting the wiper of the potentiometer 922, any stray field voltage between the screen 923 and 924** which constitute the secondary winding screens, may be reduced to nil.

In FIG. **17*a*–*h*, the individual layers of the second multilayer secondary section 654' are shown. In FIG. 17*a*, an outer top layer 925' constituting a terminal layer is shown, which outer top layer is provided with terminal fields for receiving the potentiometer 922' and the full bridge rectifier 929' in two individual positions as shown in FIG. 14 and which top layer also constitute a screen layer 925', shown in FIG. 13. In FIG. 17*b* and FIG. 17*g*, screens 923' and 924' are shown. The screens 923' and 924' are shown as windings in FIG. 13, because the screens encircle the core and thereby function as windings. The main purpose of the screens 923' and 924' is however to screen. In FIG. 17*c*, FIG. 17*d*, FIG. 17*e* and FIG. 17*f*, secondary windings 912',914', 916' and 918' respectively, with five windings are shown. In FIG. 17*h*, an outer bottom layer constituting a terminal layer is shown, which layer is provided with terminal fields for receiving two capacitors 944' and 946', shown in FIG. 13 and which bottom layer also constitutes a screen layer 925', shown in FIG. 13. By adjusting the wiper of the potentiometer 922', any stray field voltage between the screen 923' and 924'** which constitute the secondary winding screens, may be reduced to nil.

As indicated above, FIG. 18–FIG. 20 shows an alternative embodiment of a switch mode power supply transformer, which may be used in stead of the transformer shown in FIG. 13–FIG. 17.

In FIG. 18, a diagram of a single switch mode power supply transformer 652" or 654" of the switch mode power supply assembly 650" is shown. The switch mode power supply transformer 652" or 654" comprises a primary winding constituted by four separate primary windings 902", 904", 906" and 908" and a secondary winding constituted by four secondary windings 912", 914", 916" and 918". The transformer 652" or 654" further include two primary winding screens 920" and 921", which are connected to the ground of the output stage in question and further to the wiper of at potentiometer 922", which has its terminals connected to an internal screen 924" of the multilayer structure. The transformer 652" or 654" further includes two secondary winding screens 925" and 926". It has been realized that the provision of the screens 920", 922", 924", 925" and 926" and further potentiometer 922" renders it possible to reduce any capacitive coupling from the primary winding of the transformer 652" or 654" to the secondary winding thereof to extremely low levels, which further reduces the injection of noise into the electronic circuitry supplied from the transformer 652" or 654". The secondary winding of the transformers 652", 654" comprising the individual secondary windings 912", 914", 916" and 918" was connected to a full bridge rectifier 929", the positive and negative terminals of which constitutes the output terminals of the transformer 652" or 654", which terminals are connected to the smoothing network discussed above with reference to FIG. 8.

In FIG. 19, an exploded view of the switch mode power supply transformer assembly 650" is shown comprising two multilayer transformer sections constituting the first and the second transformer 652" and 654", respectively, to be described in greater detail below. Each of the transformers 652" and 654" is provided with a separate potentiometer 922" and a separate full bridge rectifier 924", which, however, as is evident from FIG. 19, are arranged at different physical locations on the multilayer implementations of the transformers 652" and 654". The assembly 650" further comprises two housing parts 926" and 928", which constitute the core of the transformers, and which are arranged receiving the transformers 652" and 654" in recesses of the housing components and clamped together by means of clamping and locking springs 930" and 932", which are further connected with soldering lugs 934" and 936", respectively. In the assembly 650", two washers 940" and 942" are further provided. Each of the switch mode power supply transformers 652" and 654" are implemented from a total for fourteen layers together constituting a multilayer transformer component including the primary and secondary windings, provisions for establishing electrically conductive connection between the individual layers of the multilayer component, and further provisions for receiving the potentiometer 922 and the full bridge rectifier 924" in two separate positions defining a top transformer component 652" and a bottom transformer component 654", as shown in FIG. 19.

In FIG. 20*a–o*, the individual layers of the multilayer component 652" and 654" are shown. In FIG. 15*a*, a top layer 925" constituting a terminal layer is shown, which top layer is provided with terminal fields for receiving the potentiometer 922" and the full bridge rectifier 929" in two individual positions as shown in FIG. 19. In FIGS. 20*b* and *c*, the first and the second secondary windings 914" and 912", respectively are shown. In FIGS. 20*d* and *e*, the secondary winding screen 924", and the internal screen 920", respectively, are shown. In FIGS. 20*f*, *g*, *h*, and *j*, the second, the first, the fourth and the third primary winding 904", 902", 908" and 906", respectively, are shown, and in FIG. 20*k*, the internal screen 921" is shown. In FIG. 201, the secondary winding screen 924" is shown, and in FIG. 20*m* and *n*, the fourth and the third secondary windings 918" and 916", respectively, are shown. In FIG. 20*o*, the screen 926" is shown. It is to be mentioned that a voltage peak of the order of $1V_{pp}$ may be present between the screens 925", 926" and the screen 924" provided the potentiometer 922" is omitted, which voltage signal originates from an input voltage signal of the order of approximately 43 $V_{pp}$. By adjusting the wiper of the potentiometer 922", any stray field voltage between the screen 924" and the screens 925" and 926", which constitute the secondary winding screens, may be reduced to nil.

It is believed that the provision of the multilayer switch mode power supply transformer in accordance with the teachings of the present invention including separate primary winding and secondary winding screens and an internal screen, which screens may be adjusted by means of a potentiometer for eliminating any stray fields between the screens and further between the secondary winding and a symmetrical point of the secondary winding of the transformer, is of the utmost importance to the provision of low high frequency noise induced by stray capacitance between switching circuits or transformer windings to ground.

EXAMPLE 1

An input section 302 of the type discussed above with reference to FIGS. 3, 4, 5 and 10 was manufactured from the following components:

16 inputs relays 310 of the type NEC EA2-24, 16 transformer coupled zerofield output stages 312 of the type TP ZFT-module type 250–300, each including: two resistors 331, 332: 5.11 kΩ, 0.25%; a zerofield transformer 320: 135Ω: 1450 Ω; an operational amplifier 336 of the type 4227G; a resistor 338; 4.99 kΩ; 0.25%; a capacitor 340; 270 pF; a resistor 342: 56 Ω, 1%; a resistor 344; 8.66 kΩ, 1%; a resistor 346; 680 kΩ, 1%; a resistor 348; 228 Ω1%; a resistor 350: 56 kΩ, 1%; a resistor 352: 330 kΩ1%; a variable resistor 354: 10 kΩ; a resistor 334: 228 Ω, 1%; a capacitor 360: 1.8 nF; an operational amplifier 362 of the type 4227G; a capacitor 364: 478 nF; a capacitor 366: 33 iΩ, 1%, a resistor 368: 228 kΩ, 1%; and a variable resistor 370: 10 kΩ. A decoupling and addressing block 316 comprising two electronic integrated circuits 318 and 320 of the type 5895, and a decoupling and addressing block 322 comprising two electronic integrated circuits 324 and 326 of the type 4051.

EXAMPLE 2

A crosspoint section 304 of the type discussed above with reference to FIGS. 3, 6 and 11 was manufactured from the following components: Four 8×16 analog switch arrays 400 of the type Mital ISO-CMOS MT8816, 3 decoders 404, 406 and 408 constituted by electronic integrated circuits of the type: CD 4094B , a decoder 422 constituted by an electronic integrated circuit of the type 4051, and 8 output stages 410 of the type NTP 250–600 each including two operational amplifiers 412 and 414 of the type RC4227G, six resistors: 150 kΩ, 150 kΩ, 12.1 kΩ, 1%, 12.1 kΩ, 1%, 49.9 kΩ, 1% and 82.5 kΩ, 1%, a capacitor ½ pF and an output switch element 416 constituted by a Quad analog switch of the type CD4065.

EXAMPLE 3

An output section 306 of the type discussed above with reference to FIGS. 3, 7, 8, 9 and 12 was manufactured from the following components:

Two 8×16 analog arrays 400' of the above described type, four decoders 404', 406', 408' and 422' of the above described types; 8 amplifier stages 410' of the above described type; 8 transformer coupled zerofield amplifier stages 450 of the type NTP 250–610; 8 capacitor 452: 10 μF, 35V; 8 resistors 454: 2.49 kΩ; 8 resistors 456: 100 kΩ; 8 resistors 472: 3.9 kΩ; 8 resistor 474: 3.9 kΩ; 8 resistors 476: 3.9 Ω; 8 NPN -transistors 466 of the type BC847A; 8 capacitors 464: 47 μF, 25V; 8 zener diodes 462: 6.7V; 8 optocouplers 480 of the type TLP 101; 8 resistors 730 and 734: 10 Ω; 8 output relays 494 of the type NED EA2-24; two decoders 490 and 492 constituted by electronic integrated circuits of type types 4094b and 5895, respectively, 8 output amplifier stages 460 of the type NTP 250-610 each including two FET-transistors 702 and 704 of the type SST 4393, two operational amplifiers 706 and 708 of the type RC 4227G, two PNP-transistors 710 and 714 of the type BC857B, two NPN -transistors 712 and 716 of the type BC847B, two NPN-transistors 718 and 722 of the type BCK 54-10, and two PNP-transistors 720 and 724 of the type BCK 51-10. The switch mode power supply 600, as shown in FIG. 8, was implemented from an oscillator circuit 602 of the type 4047, transistors 608 and 610 of the type BC847A, two transistors 612 and 614 of the type BC857A, two transistors 620 and 624 of the type IRFD9020, two transistors 622 and 626 of the type IRFD020, four resistors 660, 662, 664, and 666; 47 kΩ; two capacitors 668 and 672: 470 nF, two capacitors 670 and 674: 1nF, eight multilayer transformer winding assemblies 652 and 654, custom designed in accordance with the print lay-outs shown in FIGS. 15*a–o* and measuring approximately 28 mm×15 mm and of a height of approximately 2 mm, and including a 1 kΩ potentiometer 922, and a full bridge rectifier of the type BGX 50. The power supply units 130 and 132 were of the type Philips E 1265.

We claim:

1. An audio signal switching system comprising:

a first plurality of an input amplifier means, each of said input amplifier means having a first transformer means and a first buffer amplifier means, said first transformer means having a transformer input and a transformer output constituting a balanced input and an unbalanced output, respectively, said first transformer means receiving a balanced input signal at its transformer input, converting said balanced input signal into an unbalanced input signal and outputting said unbalanced input signal from its transformer output, said first buffer amplifier means having an amplifier input and an amplifier output, said amplifier output of said first buffer amplifier means constituting an output of said input amplifier means, said amplifier input of said first buffer amplifier means being connected to said transformer output of said first transformer means, and said first buffer amplifier means receiving said unbalanced input signal from said transformer output of said first transformer means at its amplifier input, amplifying said unbalanced input signal and outputting an amplified and unbalanced signal from its amplifier output, a second plurality of an output amplifier means, each of said output amplifier means having a second transformer means and a second buffer amplifier means, said second transformer means having at transformer input and a transformer output constituting a grounded input and an ungrounded output, perspectively, said transformer input of said second transformer means constituting an input of said output amplifier means, said second transformer means receiving an output signal at its transformer input, converting said output signal into an ungrounded output signal and outputting said ungrounded output signal from its transformer output, said second buffer amplifier means having an amplifier input and a pair of symmetrical amplifier outputs, said second buffer amplifier means receiving said ungrounded output signal from said transformer output of said second transformer means at its amplifier input, amplifying said ungrounded signal and outputting an amplified ungrounded and symmetrical output signal from its pair of symmetrical amplifier outputs, switching means for interconnecting at least a single output of a specific input amplifier means and at least a single input of a specific output amplifier means for inputting said amplified and unbalanced signal from said specific input amplifier means to said specific output amplifier means, and a switch mode power supply means comprising an oscillator means generating an oscillator signal, and an output power means receiving said oscillator signal for said oscillator means and outputting a power oscillator signal, each of said output amplifier means comprising a separate switch mode power supply means receiving said power oscillator signal from said output power means of said switch mode power supply and including a separate switch mode power supply transformer means, said second transformer means and said switch mode power supply transformer means of each of said output amplifier means galvanically separating said pair of symmetrical outputs of said second buffer amplifier means of each of said output amplifier means from each other and from said outputs of said input amplifier means, respectively.

2. An audio signal switching system according to claim 1, said switching means comprising a switching array means of a matrix configuration comprising a number of inputs identical to said first plurality of input amplifier means and a number of outputs identical to said second plurality of output amplifier means, said inputs of said switching array means being connected to respective outputs of said first plurality of input amplifier means and said outputs of switching array means being connected to respective inputs of said second plurality of said output amplifier means.

3. An audio signal switching system according to claim 2, said switching array means of said matrix configuration being an electronically addressable switching array means.

4. An audio signal switching system according to claim 2 each of said switch mode power supply transformer means being constituted by a primary section and one or more secondary sections being implemented in multilayer technique and comprising at least one layer including one or more primary windings, and one or more layers including one or more screens for screening said primary windings relative to the environment so as to eliminate noise generated by capacitive coupling, and each of said second sections being implemented in multilayer technique and comprising at least one layer including one or more secondary windings and one or more layers including one or more screens for screening said secondary windings relative to one another and relative to the environment so as to eliminate noise generated by capacitive coupling to said secondary winding.

5. An audio signal switching system according to claim 4, said primary section further includes a separate layer including a first set of terminals for establishing electrically conductive contact to said primary windings.

6. An audio signal switching system according to claim 4, each of said secondary sections further includes a separate layer including a set of terminals for establishing electrically conductive contact to said secondary windings.

7. An audio signal switching system according to claim 5, said separate layer further being provided with terminals for establishing electrically conductive contact to said one or more screens.

8. An audio signal switching system according to claim 6, said separate layer further being provided with terminals for establishing electrically conductive contact to said one or more screens and with provisions for mounting a rectifier means in electrically conductive contact with said second set of terminals and with provision for mounting capacitor means in electrically conductive contact with the terminals of said rectifier.

9. An audio signal switching system according to claim 8, said one or more screens comprising secondary windings screen and a separate layer with provisions for mounting a potentiometer and with terminals for establishing electrically conductive contact between said potentiometer and secondary winding screens for balancing said secondary winding screens relative to one another.

10. An audio signal switching system according to claim 9 being of modular structure, a first section comprising said first plurality of first amplifier means, a second section comprising said switching means and a third section comprising said second plurality of output amplifier means and said switch mode power supply.

11. An audio signal switching system according to claim 10 each of said amplifier means and/or each of said output amplifier means constituting a transformer coupled zerofield amplifier means.

* * * * *

UNITED STATES PATENT AND TRADEMARK OFFICE
CERTIFICATE OF CORRECTION

PATENT NO. : 5,130,662

DATED : 14 July 1992

INVENTOR(S) : Jørgensen et al.

It is certified that error appears in the above-identified patent and that said Letters Patent is hereby corrected as shown below:

On the Title page, item [19], delete "Jorgfensen" and insert --Jorgensen and item [75], "Inventors" on title page, delete "Bent Jørgfensen" and insert --Bent Jørgensen--.

In column 4, line 16, delete "second" and insert --secondary--.

In column 10, line 15, delete "form" and insert --from-.

In column 16, line 62, delete "33 iΩ" and insert --33 kΩ--.

In column 17, line 6, delete "Mital" and insert --Mitel--.

In column 17, line 33, delete "NED" and insert --NEC--.

In column 18, line 47, delete "for" and insert --from--.

UNITED STATES PATENT AND TRADEMARK OFFICE

CERTIFICATE OF CORRECTION

PATENT NO. : 5,130,662

DATED : July 14, 1992

INVENTOR(S) : Jorgensen, et. al.

It is certified that error appears in the above-indentified patent and that said Letters Patent is hereby corrected as shown below:

In column 19, line 18, delete "second" and insert --secondary--.

Signed and Sealed this

Fifth Day of April, 1994

Attest:

Bruce Lehman

BRUCE LEHMAN

*Attesting Officer*

*Commissioner of Patents and Trademarks*